United States Patent
Delacourt et al.

(10) Patent No.: US 10,552,796 B1
(45) Date of Patent: Feb. 4, 2020

(54) APPROVAL SERVICE IN A CATALOG SERVICE PLATFORM

(71) Applicant: Amazon Technologies, Inc., Reno, NV (US)

(72) Inventors: Frederik Christophe Delacourt, Mercer Island, WA (US); Quan Binh To, Redmond, WA (US); Christopher Whitaker, Sammamish, WA (US); Benjamin David Newman, Seattle, WA (US); Zachary Thomas Crowell, Redmond, WA (US); Julien Jacques Ellie, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 644 days.

(21) Appl. No.: 14/577,161

(22) Filed: Dec. 19, 2014

(51) Int. Cl.
*G06Q 10/10* (2012.01)
*G06Q 10/06* (2012.01)

(52) U.S. Cl.
CPC ........... *G06Q 10/103* (2013.01); *G06Q 10/06* (2013.01)

(58) Field of Classification Search
CPC ..... G06Q 10/103; G06F 21/10; G06F 21/105; G06F 21/44; G06F 21/50; G06F 21/51; G06F 21/57
See application file for complete search history.

(56) References Cited

U.S. PATENT DOCUMENTS

| | | | | |
|---|---|---|---|---|
| 4,503,499 A | * | 3/1985 | Mason | G06Q 10/10 709/206 |
| 5,125,075 A | * | 6/1992 | Goodale | H04L 51/34 709/206 |

(Continued)

OTHER PUBLICATIONS

S. Singh and S. Sharma, "Improving security mechanism to access HDFS data by mobile consumers using middleware-layer framework," Fifth International Conference on Computing, Communications and Networking Technologies (ICCCNT), Hefei, Jul. 2014, pp. 1-7. (Year: 2014).*

(Continued)

*Primary Examiner* — Gerardo Araque, Jr.
(74) *Attorney, Agent, or Firm* — Robert C. Kowert; Kowert, Hood, Munyon, Rankin & Goetzel, P.C.

(57) ABSTRACT

A service provider system may implement an approval service that manages approval requests received from other services on behalf of a customer organization and its end users. An administrator in the organization may create approval templates that define voting strategies at multiple approval levels and associate them with particular requests (individually, or by product, portfolio, project, action, message topic, workflow, or request type). The administrator may create approval groups whose members are authorized to respond to particular requests. Each approval template (or approval level) may include a different voting strategy or be associated with a different approval group. The approval system may support pre-notification of subsequent approval levels, auto-escalation, or auto-expiration. The approval (Continued)

service may employ a notification service to manage actionable notification messages that include approval requests. Members of approval groups may retrieve requests and select from available actions (e.g., approve, deny, or request more information).

20 Claims, 25 Drawing Sheets

(56) References Cited

U.S. PATENT DOCUMENTS

| | | | | |
|---|---|---|---|---|
| 5,276,869 | A * | 1/1994 | Forrest | G06F 17/30011 707/999.009 |
| 6,324,569 | B1 * | 11/2001 | Ogilvie | G06Q 10/107 709/206 |
| 6,751,657 | B1 * | 6/2004 | Zothner | G06F 9/542 709/203 |
| 8,484,355 | B1 * | 7/2013 | Lochhead | H04L 41/0806 709/226 |
| 8,756,324 | B2 * | 6/2014 | Polla | G06Q 10/06 709/226 |
| 8,874,621 | B1 * | 10/2014 | Goodwin | G06F 17/30292 707/756 |
| 8,973,090 | B1 * | 3/2015 | Banerjee | G06F 21/51 726/1 |
| 9,846,772 | B1 * | 12/2017 | Satish | G06F 21/566 |
| 2002/0038236 | A1 | 3/2002 | Schechter et al. | |
| 2002/0073161 | A1 * | 6/2002 | Yamazaki | G06Q 10/10 709/206 |
| 2002/0152254 | A1 * | 10/2002 | Teng | G06F 21/41 718/100 |
| 2003/0023675 | A1 * | 1/2003 | Ouchi | G06F 15/16 709/203 |
| 2003/0061068 | A1 * | 3/2003 | Curtis | G06Q 10/06311 705/26.25 |
| 2003/0139971 | A1 | 7/2003 | Rescigno et al. | |
| 2003/0145276 | A1 * | 7/2003 | Hirata | G06Q 10/10 715/234 |
| 2003/0181991 | A1 * | 9/2003 | Chau | G05B 19/41865 700/1 |
| 2004/0019807 | A1 * | 1/2004 | Freund | H04L 63/0227 726/1 |
| 2004/0064472 | A1 * | 4/2004 | Oetringer | G06Q 10/10 |
| 2004/0083448 | A1 * | 4/2004 | Schulz | G06Q 10/06 717/101 |
| 2004/0205075 | A1 * | 10/2004 | LaTurner | G06Q 10/10 |
| 2005/0021646 | A1 * | 1/2005 | Kumar | H04L 29/06 709/206 |
| 2005/0043979 | A1 * | 2/2005 | Soares | G06Q 10/10 705/7.42 |
| 2005/0240758 | A1 * | 10/2005 | Lord | H04L 63/0263 713/153 |
| 2005/0251409 | A1 * | 11/2005 | Johnson | G06Q 30/02 705/343 |
| 2006/0010221 | A1 | 1/2006 | Srinivasan | |
| 2006/0122859 | A1 * | 6/2006 | Feldman | G06Q 10/10 705/301 |
| 2006/0259524 | A1 * | 11/2006 | Horton | G06F 17/2288 |
| 2007/0092783 | A1 * | 4/2007 | Gibbons | G06Q 10/06 705/7.12 |
| 2007/0156428 | A1 * | 7/2007 | Brecht-Tillinger | G06Q 10/06 705/26.1 |
| 2007/0179790 | A1 * | 8/2007 | Leitch | G06Q 10/0633 705/301 |
| 2007/0288364 | A1 * | 12/2007 | Gendler | G06Q 10/06313 705/39 |
| 2008/0133748 | A1 | 6/2008 | Nicholas | |
| 2008/0301699 | A1 * | 12/2008 | Macer | G06Q 10/06 718/107 |
| 2009/0204897 | A1 * | 8/2009 | Sogge | G06Q 10/06 715/700 |
| 2009/0281865 | A1 * | 11/2009 | Stoitsev | G06Q 10/06 705/7.22 |
| 2010/0049628 | A1 * | 2/2010 | Mannava | G06Q 10/10 705/26.1 |
| 2010/0287104 | A1 * | 11/2010 | Leroy | G06Q 10/101 705/300 |
| 2010/0306011 | A1 * | 12/2010 | Correll | G06Q 10/06 705/7.36 |
| 2011/0029772 | A1 * | 2/2011 | Fanton | G06F 21/10 713/165 |
| 2011/0282709 | A1 * | 11/2011 | Rangaswamy | G06Q 10/06 705/7.27 |
| 2012/0072985 | A1 | 3/2012 | Davne et al. | |
| 2012/0102114 | A1 * | 4/2012 | Dunn | G06Q 10/10 709/204 |
| 2012/0124211 | A1 * | 5/2012 | Kampas | G06F 9/50 709/226 |
| 2012/0166206 | A1 * | 6/2012 | Feely | G06Q 10/10 705/1.1 |
| 2012/0185913 | A1 * | 7/2012 | Martinez | G06F 9/455 726/1 |
| 2012/0233668 | A1 * | 9/2012 | Leafe | G06F 9/44526 726/4 |
| 2013/0124638 | A1 | 5/2013 | Barreto et al. | |
| 2013/0145033 | A1 * | 6/2013 | Polla | G06Q 10/06 709/226 |
| 2013/0268357 | A1 * | 10/2013 | Heath | H04L 63/00 705/14.53 |
| 2013/0268936 | A1 * | 10/2013 | Hsu | G06Q 10/0633 718/102 |
| 2013/0304903 | A1 * | 11/2013 | Mick | H04L 43/0817 709/224 |
| 2013/0318589 | A1 * | 11/2013 | Ford | H04L 63/08 726/7 |
| 2013/0346569 | A1 * | 12/2013 | Smith | H04L 41/0803 709/220 |
| 2014/0052643 | A1 * | 2/2014 | Baldwin | G06Q 10/06 705/301 |
| 2014/0180938 | A1 * | 6/2014 | Domke | G06Q 30/018 705/317 |
| 2014/0273978 | A1 | 9/2014 | Van Snellenberg | |
| 2014/0279569 | A1 * | 9/2014 | Baldwin | G06Q 10/103 705/301 |
| 2014/0282084 | A1 | 9/2014 | Murarka et al. | |
| 2014/0289132 | A1 | 9/2014 | Ganesan | |
| 2014/0365662 | A1 * | 12/2014 | Dave | G06F 9/45533 709/226 |
| 2015/0095092 | A1 * | 4/2015 | Medikundam | G06Q 10/06316 705/7.26 |
| 2015/0212674 | A1 | 7/2015 | Firstenberg et al. | |
| 2015/0286505 | A1 * | 10/2015 | Liu | G06F 9/5011 718/104 |
| 2015/0355932 | A1 * | 12/2015 | Hiebert | G06F 9/45558 718/1 |
| 2016/0065417 | A1 * | 3/2016 | Sapuram | G06Q 30/0631 709/223 |

OTHER PUBLICATIONS

N. Markatchev, R. Curry, C. Kiddie, A. Mirtchovski, R. Simmonds and T. Tan, "A Cloud-Based Interactive Application Service," Dec. 2009 Fifth IEEE International Conference on e-Science, Oxford, 2009, pp. 102-109. (Year: 2009).*
U.S. Appl. No. 14/538,717, filed Nov. 11, 2014, Quan Binh To.
"Apple Announces iOS 8 Available Sep. 17", Apple Press Info, Sep. 9, 2014, pp. 1-3.

* cited by examiner service provider console / approval service / create approval group

[create approval group] [create approval template] [configure approval request(s)] [reports] [pending requests]
[delete approval group] [delete approval template]

Create Approval Group

Approval Group Name: [Level 1 project managers]

Approval Group Owner: [customer A account ID]

Identity & Access Management policies: [none]

Add approval group members:
- ☐ Abel C.
- ☐ Brad P.
- ☑ Charlie L.
- ☐ Dina B.
- ☐ Everett R.
- ☐ Fran E.
- ☑ Gerry G.
- ☐ Hal P.
- ☐ Ivan M.
- ☑ Jenny B.
- ☐ Karen R.
- ☑ Larry M.
- ☐ Mark W.
- ...

[Go Back] [Cancel] [Create and Continue]

FIG. 3A

300 service provider console / approval service / create approval group

| create approval group | create approval template | configure approval request(s) | reports | pending requests | delete approval group | delete approval template

Create Approval Group

Approval Group Name: [Level 2 purchasing]

Approval Group Owner: [customer A account ID]

Identity & Access Management policies: [none]

Add approval group members:
- ☐ legal team rep
- ☑ financial controller
- ☐ vacation approver
- ☑ financial auditor
- ☐ quality assurance rep
- ☑ purchasing approver
- ☐ project team leader
- ☐ department manager
- ☐ human resources mgr
- ☐ CTO
- ☐ CEO
- ...

[Create and Continue]

Go Back    [Cancel]

FIG. 3B service provider console / approval service / create approval template

| create approval group | create approval template | configure approval request(s) | reports | pending requests |

| delete approval group | delete approval template |

Create Approval Template

Template Name: [Two-level product access approval]

Number of approval levels: [2]

Backend service source(s):
enterprise catalog service
desktop application fulfillment service
resource stack management service Go Back  Cancel  Select & Continue

APPROVAL SERVICE IN A CATALOG SERVICE PLATFORM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

Managers and other authority figures within companies and other organizations often send messages to their members that include instructions to perform tasks using emails or text messaging. In addition, requests for approval to perform tasks or access resources are often sent from employees or managers to other employees, managers and/or other authority figures using emails or text messaging. However, once the emails or text messages are sent, the sender does not have any control over them, nor any mechanism for determining whether or not the instructions were followed (or for determining the state of pending approval requests). In some cases, if there are multiple acceptable actions that an organization member can take in response to such a message, the sender might like to know which of these actions, if any were taken. In some cases, if an email or text message that includes instructions to perform a task (or respond to an approval request) is sent to multiple people (e.g., all of the members of a department or project team), the sender will typically not have any control over, or knowledge of, which, if any, of the recipients actually read the email or text message and/or perform the task (or respond to the approval request). Therefore, in an organization in which many such emails or text messages are exchanged between the members of the organization, keeping track of what has or has not been done (much less by whom) can be difficult and error-prone. In addition, this approach can easily lead to an important task going unperformed (or an important approval request being ignored) while each member of the organization that received the message assumes that another member will perform the task (or respond to the approval request).

BRIEF DESCRIPTION OF THE DRAWINGS

FIGS. 3A and 3B illustrate examples of the information presented to an IT administrator through a graphical user interface of a service provider management console when creating approval groups that are to be managed by an approval service, according to at least some embodiments.

FIGS. 4A and 4B illustrate examples of the information presented to an IT administrator through a graphical user interface of a service provider management console when creating an approval template that is to be managed by an approval service, according to at least some embodiments.

FIGS. 5A-5C illustrate examples of the information presented to an IT administrator through a graphical user interface of a service provider management console when associating an approval group and/or an approval template to one or more approval requests and when viewing a resulting approval request, according to at least some embodiments.

Figure 1:
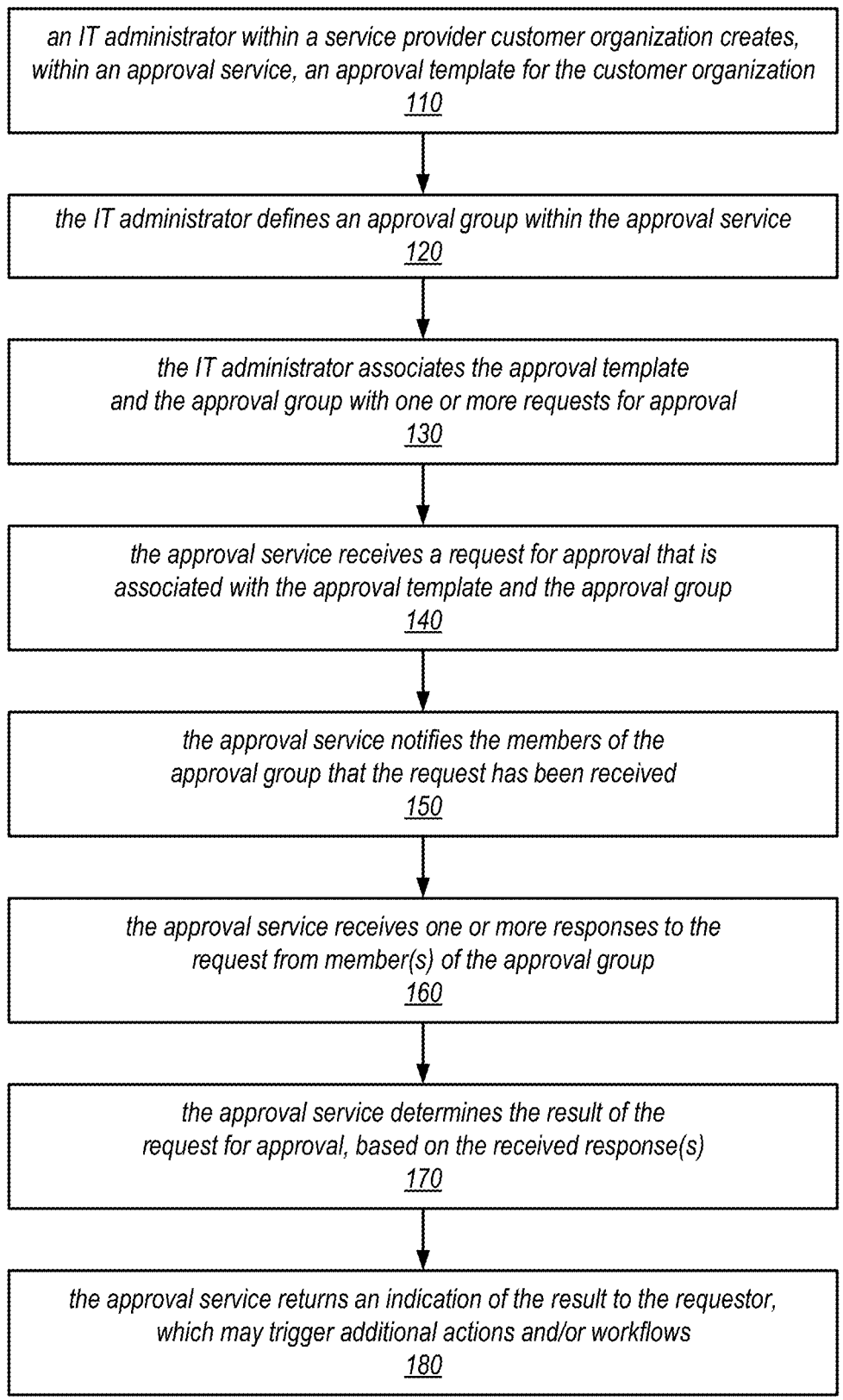
FIG. 1 is a flow diagram illustrating one embodiment of a method for configuring and using an approval service.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A service provider system may implement an approval service that manages approval requests received from other services on behalf of a customer organization and its end users. For example, in a service provider system that provides an "enterprise catalog service" that manages software products (e.g., desktop applications and server products) and portfolios of software products on behalf of customer organizations, a resource stack management service, and/or a desktop application fulfillment platform, the approval service may allow an IT administrator in the customer organization to define approval strategies for various approval requests that are submitted by (or on behalf of) IT administrators and/or end users in the customer organization (e.g., requests to install, update, or launch products, or to access or share portfolios).

As described in more detail herein, an IT administrator in a service provider customer organization may create reusable approval templates that define voting strategies at multiple approval levels. In some embodiments, the approval templates may define different voting strategies for each approval level (e.g., majority vote, single approval, or single veto strategies). The IT administrator may also create reusable approval groups (e.g., groups of active directory users or identity and access management roles, or IAM roles) whose members are authorized to respond to particular requests. In some embodiments, the IT administrator may associate the reusable approval templates and/or reusable approval groups with different approval requests (e.g., individually, or by product, portfolio, project, action, message topic, workflow, or request type). For example, the IT administrator may associate an approval template with a given approval request (or with multiple requests) and may associate different approval groups (e.g., first level team leaders, IT administrators, legal team members, or second level managers) with each approval level defined in the approval template. The approval system may also support pre-notification of subsequent approval levels, auto-escalation, and/or auto-expiration, in some embodiments.

As described in more detail herein, in some embodiments, the approval service may employ a notification service that is provided by the service provider system to manage actionable notification messages that include approval requests. In such embodiments, members of various approval groups may retrieve approval requests from specific message inboxes (e.g., one per approval group) and may respond to them by selecting one of several available actions (e.g., by selecting "approve", "deny", or "request more information"). By employing reusable approval groups, the systems described herein may reduce or eliminate the types of bottlenecks experienced in other systems that are caused by approval chains that include a single individual at each level.

As noted above, the members of a reusable approval group may include active directory users (and groups of active directory users) and/or IAM users (and groups of IAM users). In other words, the members of an approval group may include one or more of: an end user in the customer organization, a group of end users in the customer organization, a member of the customer organization having a particular identity and access management role, or an identity and access management group. Note that the abbreviation "IAM" and the phrases "identity and access management user" (or "IAM user"), "identity and access management policy" (or "IAM policy"), and "identity and access management role" (or "IAM role") may refer to users, policies, and/or roles for managing users, security credentials, and/or permissions that are defined and enforced through a dedicated identity and access management service implemented by the service provider system, or may, more generally, refer to users, policies and/or roles for managing users, security credentials, and/or permissions that are defined and enforced in other ways within (or in collaboration with) the service provider system.

In some embodiments, the approval templates created by IT administrators (or other privileged users or users to whom authority to create templates has been delegated) may define an approval scheme that includes a sequence or chain of approvals that are needed in order to approve a request. For example, an approval template may specify the number of approval levels, the sequence in which the approval levels are used to determine a result of an approval request and/or a voting strategy to be applied at each of the approval levels. As previously noted, the voting strategy for a given approval level may be different than the voting strategy for one or more other approval levels. Note that, in some embodiments, an approval template may be associated with a multi-step process such that a respective approval level is defined by the template (e.g., with its own voting strategy definition and/or approval group) for each step of the process. In some embodiments, approval templates may be nested. In other words, a given approval template may specify that another (previously defined) approval template should be applied at a particular one of the approval levels defined by the given approval template.

In various embodiments, the voting strategy that is defined for a given approval request (or approval level thereof) may specify one or more of: a number of affirmative responses required to approve an approval request, a percentage of the received responses that are required to be in the affirmative to approve an approval request, a number of negative responses required to deny an approval request, a percentage of the received responses that are required to be in the negative to deny an approval request, a number or percentage of members of an approval group whose responses are required to be received in order to determine a result of an approval request, or other criteria, some of which are described herein.

Examples of the voting strategies (or elements thereof) that may be specified for a respective approval level include, but are not limited to, the following:

a majority of the members of the associated approval group must respond in the affirmative in order to approval a request (e.g., a majority vote strategy)

a majority of the members of the associated approval group must respond in the negative in order to deny or reject a request (e.g., a majority vote strategy)

a result cannot be determined unless all members of the associated approval group respond to the request a result cannot be determined unless a quorum of the members of associated approval group respond to the request (the number or percentage of members required for a quorum also being specified in the approval template)

a result can be determined as soon as any criteria is met for determining a result, regardless of whether or not all members of the associated approval group have responded to the request only a specified subset of the members of the associated approval group (e.g., one, two, or another specified number of members) must respond in the affirmative in order to approve a request (e.g., a "single approval" strategy)

a specified number of members of the associated approval group (e.g., one, two, or another specified number) responding in the negative triggers the denial or rejection of a request (e.g., a "single veto" strategy)

specific users or roles (or a specified number of members of the approval group having a particular role) may be required to respond in the affirmative in order to approve a request (along with zero or more other members of the approval group, in some cases).

As noted above, in some embodiments, an approval template and one or more approval groups (e.g., a single approval group for a single-level approval scheme, or multiple approval groups for a multiple-level approval scheme) may (e.g., by an IT administrator interacting with an approval service) be associated with one or more approval requests (e.g., individually, or by associating the approval template and approval group(s) with a particular product, portfolio, project, action, message topic, workflow, or request type with which approval requests are associated or related). Subsequently, if an approval request that has been associated with the approval template and approval groups is received by the approval service, the members of at least one of the approval groups (e.g., members of the approval group that is associated with the first, or lowest, approval level in a sequence of approval levels, in the case of a multiple-level approval scheme) may be notified that the approval request has been received. In response to the notification, some or all of the members of the approval group may retrieve or access the approval request and respond to it (e.g., submitting their "vote").

After each of one or more members of the approval group submits their response, the approval service may re-evaluate the collective responses against the voting strategy that was defined in the approval template to determine whether a threshold or other criteria for approval or rejection of the request have been met. If so, the approval service may be configured to return an indication of the result of the approval request for the current approval level (i.e., the result of the voting, according to the voting strategy defined by the approval template). If not, the approval service may be configured to wait for more responses (e.g., for a predetermined time period, in some cases) or to take other actions, as described in more detail below. If there are no additional approval levels to be considered, the result of the approval request for the current approval level may be returned to the requestor. For example, it may be returned to a member of the customer organization (e.g., an administrator, manager, or end user) on whose behalf it was submitted directly (e.g., through a console of the approval service) or through a console of another service provided by the service provider (e.g., a service through which the request was submitted).

In some embodiments, regardless of whether the approval template and approval groups were created by an IT administrator (or another privileged user or a user to whom authority to create templates has been delegated) with a particular approval request or group of approval requests in mind, they may be subsequently reused by the IT administrator (or other privileged/authorized user). In other words, once one or more approval templates and approval groups have been created, they may be associated (in any combination) with multiple related or unrelated approval requests or groups of approval requests (e.g., individually, or by associating the approval template and approval group(s) with a particular product, portfolio, project, action, message topic, workflow, or request type).

One embodiment of a method for configuring and using an approval service is illustrated by the flow diagram in FIG. 1. As illustrated at 110, in this example, the method may include an IT administrator within a service provider customer organization creating, within an approval service, an approval template for the customer organization. The method may include the IT administrator defining an approval group within the approval service, as in 120, and the IT administrator associating the approval template and the approval group with one or more requests for approval, as in 130. For example, the approval template and the approval group may be associated with the requests for approval individually, or by virtue of the approval template and the approval group being associated with a product, portfolio, project, action, message topic, workflow, or request type that is a subject or target of the request.

As illustrated in this example, the method may include the approval service receiving a request for approval that is associated with the approval template and the approval group, as in 140. In response to receiving this request, the method may include the approval service notifying the members of the approval group that the request has been received, as in 150. Note that this notification may be performed in a variety of different ways, in different embodiments, including but not limited to, sending a notification message over a data stream, placing a notification in a message inbox, sending a notification using an external messaging service (e.g., in an email or text message), or sending a notification to a console of the approval service or another service in this system. Subsequent to notifying the members of the approval group that the request has been received, the method may also include the approval service receiving one or more responses to the request from member(s) of the approval group, as in 160. As illustrated in FIG. 1, the method may include the approval service determining the result of the request for approval, based on the received response(s), as in 170, and the approval service returning an indication of the result to the requestor, which may trigger the performance of additional actions and/or workflows, as in 180. For example, if a request to access a software product is approved, this may trigger a workflow to deliver the software product to the requestor; if a request to subscribe to a service is approved, this may trigger a workflow for obtaining a subscription to that service (or a license for its use); or if a request to share information is approved, this may trigger a workflow that provides the information to a recipient or makes the information available for discovery by one or more potential recipients.

As noted above, in some embodiments, a service provider may provide a variety services to its customers (e.g., to customer organizations), including an approval service and one or more other services. In some embodiments, these other services (sometimes referred to herein as "backend" services) may interact with an approval service (e.g., through various APIs) to manage requests to access to the resources and/or services that they provide to the customer organization.

Figure 2:
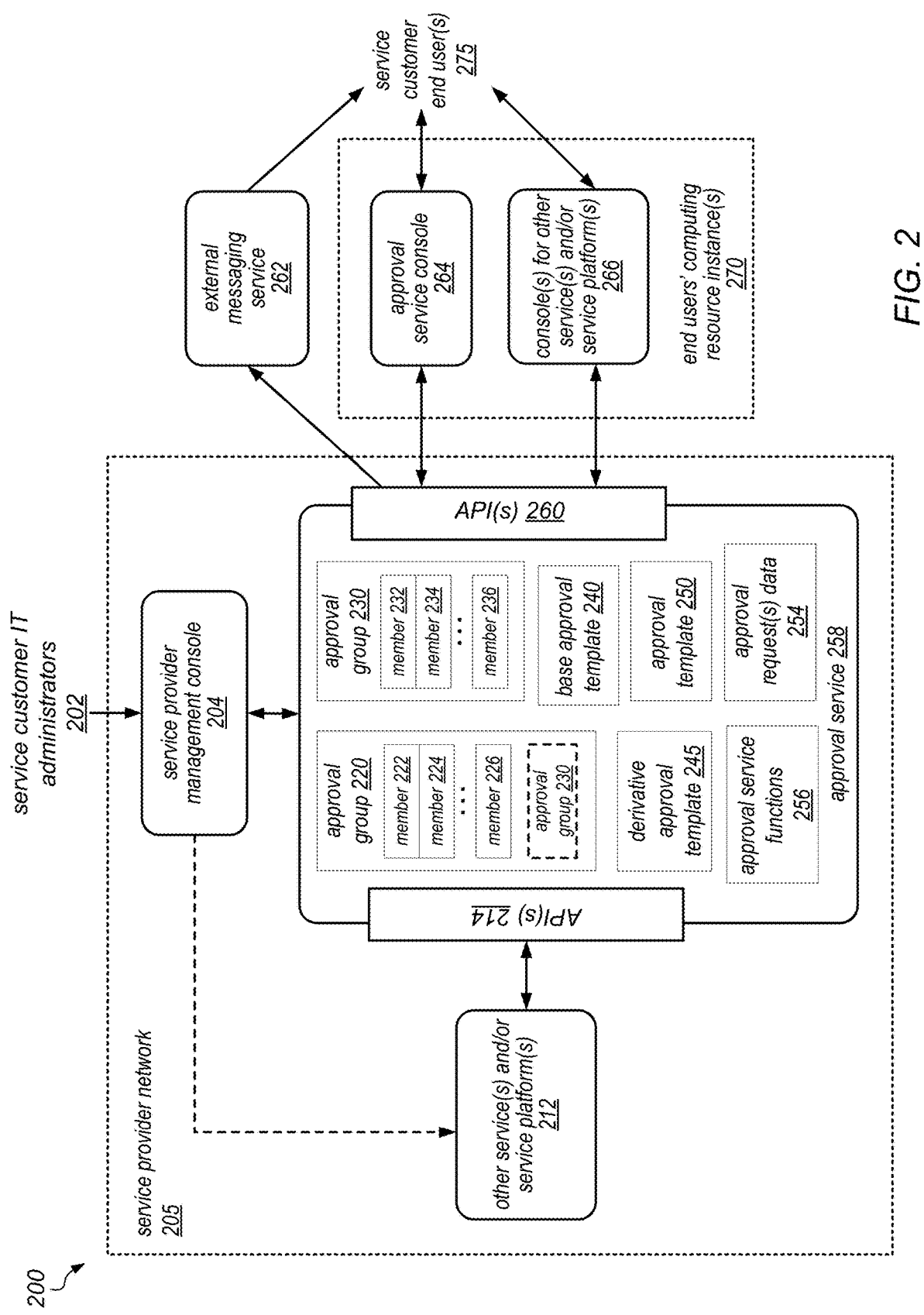
FIG. 2 is a block diagram illustrating one embodiment of a service provider system that is configured to implement an approval service that manages approval requests on behalf of backend services of the service provider.

One embodiment of a service provider system that is configured to implement an approval service that manages approval requests on behalf of backend services of the service provider is illustrated by the block diagram in FIG. 2 In this example, system 200 includes, on a service provider network 205, physical and/or virtualized computing resources that are configured to provide a variety of services for the IT administrators, buyers, and/or end users within a service provider customer (e.g., various members of a service provider customer organization). System 200 also includes client-side components of at least some of these platforms and services that are implemented on various end users' computing resource instances 270 (which may include physical computing devices and/or virtualized computing resource instances, some of which may be hosted on physical resources on service provider network 205—not shown). In this example, servicer provider network 205 includes an approval service 258 and one or more other services and/or service platforms 212, each of which is a customer of approval service 258. Note that in various embodiments, any number of different services provided to customer organizations and their end users (which may sometimes be referred to herein as "backend services" of the service provider or service provider network) may be customers of an approval system such as those described herein.

As described in more detail herein, each of service customer end users 275 may receive one or more services from service provider network 205 on whose behalf approval requests are managed by approval service 258. In the example illustrated in FIG. 2, an end user 275 may consume or otherwise interact with at least some of those services through a dedicated client-side interface mechanism. For example, an end user 275 may interact with one of the services or platforms 212 through a dedicated console for that service or platform (shown as console 266). Note, however, that in other embodiments, more, fewer, or different mechanisms may be provided to service customer IT administrators and/or end users for consuming or otherwise interacting with the services provided by service provider network 205 (and the underlying resources and platforms thereof). For example, in some embodiments, two or more services provided by service provider network 205 may be accessed by a service customer end user 275 though a single end user module or console 266 that is implemented on the end user's computing resource instance 270. Note also that, in some embodiments, end users 275 may not have access to approval service 258 directly (e.g., through a dedicated client-side console such as approval service console 264 illustrated in FIG. 2), but may access various approval requests that they are authorized to access through a user interface of a module or console 266 for one of the backend services 212 from which they receive services.

In this example, IT administrators 202 (and, in some cases, other privileged users) within the customer organization may access the approval service 258 through a service provider management console 204. As illustrated in FIG. 2, IT administrators 202 may also access the one or more other services 212 provided by service provider network 205 through service provider management console 204. In other embodiments, one or more of these other services 212 may be accessed through a different interface mechanism than the one through which IT administrators 202 interact with approval service 258, such as through a dedicated interface module or browser application (e.g., a web page). Note that in some embodiments, a graphical user interface of the service provider management console 204 may present different information and different views at different times in order for the IT administrator to view (and, in some cases, take action in response to) various approval requests (e.g., from the backend services on whose behalf approval service 258 stores, dispatches, updates, and/or otherwise manages those approval requests) and/or to manage the one or more other services 212 provided by service provider network 205.

As described in more detail herein, approval service 258 may be configured to manage approval requests that are created by various backend services and that are directed to IT administrators 202 (and/or other privileged user) and end users 275 who consume those backend services. For example, an IT administrator 202 (e.g., through service provider management console 204) or a backend service (e.g., through one of APIs 214) may request the creation of an approval group and/or an approval template, or the association of an approval template and one or more approval groups (e.g., a respective approval group for each level of a multi-level approval template) with various products, portfolios, projects, actions, message topics, workflows, or approval request types. In the example illustrated in FIG. 2, two approval groups and two approval templates have been created for managing approval requests by approval service 258 on behalf of a customer organization. These include approval group 220 (which currently includes members 222-227), approval group 230 (which currently includes members 232-236), base approval template 240, derivative approval template 245, and approval template 250. Note that an approval group may include one or more active directory users, user groups, IAM roles, or IAM groups, in different embodiments. Note that, in some embodiments, approval groups may be nested. This is illustrated in FIG. 2 by the inclusion of approval group 230 as one of the members of approval group 220. Note also that, as illustrated in this example, some approval templates (such as approval template 250) may be stand-alone approval templates that were created for a specific approval workflow and are used only within that approval workflow, while others (such as base approval template 240) may be created (or treated) as base approval templates that can be reused within multiple approval workflows and/or from which other approval templates (such as derivative approval template 245) may be derived.

As illustrated in this example, approval service 258 may include storage for data related to approval requests (shown as approval request(s) data 254). For example, this data may include information representing approval requests, approval groups, approval templates, associations between approval groups and/or approval templates and approval requests (e.g., individually or by virtue of their association with a product, portfolio, project, action, message topic, workflow, or request type). Approval service 258 may also include hardware components (e.g., circuitry) and/or software components that implement various approval service functions 256. For example, approval service functions 256 may be configured to parse and evaluate responses received from approvers against the appropriate approval templates to determine the results of various approval requests (or to determine whether the result can be determined from the available responses), to notify or pre-notify various approval groups that approval requests directed to them have been received, to enforce auto-escalation and/or auto-expiration features that are applicable to particular approval requests, and/or to perform other functions of the approval service 258, some of which may be described herein. As illustrated in FIG. 2, notification service 258 may provide various APIs 260 through which end user consoles (such as those shown as 264 and 266) and/or an external messaging service (such as external messaging service 262) interact with notification 258 (e.g., to submit, retrieve, and/or respond to approval requests).

In this example, an end user 275 may receive (e.g., through approval service console 264 or through a user interface of a module or console 266 for one of the backend services 212 from which they receive services, such as the backend service that initiated the approval request) an alert or other indication when an approval request that they are authorized to respond to (e.g., by virtue of being a member of an approval group that is associated with the request) is received, after which the end user 275 may retrieve (and, in some cases, take action on) the approval request (e.g., through approval service console 264 or through a user interface of a module or console 266 for one of the backend services 212 from which they receive services, such as the backend service that initiated the actionable notification message). In some embodiments, approval service 258 may employ an external messaging service (a client-side component of which is shown in FIG. 2 as external messaging service 262) in order to alert an end user when an approval request is received that the end user is authorized to access (e.g., through email or a text message). In response to receiving the alert, the end user may retrieve (and, in some cases, take action on) the approval request (e.g., through approval service console 264 or through a user interface of a module or console 266 for one of the backend services 212 from which they receive services, such as the backend service that initiated the actionable notification message).

Note that FIG. 2 illustrates a system 200 that is configured to provide services to members of a single customer organization. However, in other embodiments, the approval system may be configured to manage approval requests on behalf of multiple customers or customer organizations, each of which may create and configure their own approval groups and/or approval templates for managing the approval requests received on their behalf from the backend services they consume.

As noted above, an IT administrator (or other privileged/authorized user) may create reusable approval templates that define the voting strategies to be applied to requests for approval that are associated with those approval templates. In some embodiments, the approval templates may specify approval criteria other than other the number or percentage of affirmative and negative responses to the approval requests. For example, in some embodiments, an approval template may specify a cost threshold above which the voting strategy may change (e.g., for requests that result in a cost greater than the limit that can be approved by individual members of the approval group for that level). In this example, if the cost exceeds such a threshold, an additional approval level may be required in order to approve the request or a response in the affirmative from a particular member of the approval group (e.g., a financial controller or a particular manager) may be required in order to approve the request.

In various embodiments, the approval services described herein may implement one or more default or optional features to assist the customer organization in making approval request decisions more quickly (e.g., for business critical and/or time critical approval request decisions.) For example, in some embodiments, the approval service may support a pre-notification feature. In embodiments in which this feature is enabled for all approval requests (or for a given request, as specified in the associated approval template), the members of an approval group at the next approval level may be pre-notified (e.g., prior to a result being determined at the current approval level) that an approval request directed to them has been received. This pre-notification feature may give the approvers at the next approval level time to review the approval request, to ask questions of the requestor, to perform research into the implications and/or costs associated with granting or denying the approval request, and/or to take other actions to prepare them to respond (e.g., more quickly than might otherwise be the case) to the approval request once it reaches the next approval level.

In some embodiments, the approval service may support an auto-escalation feature. In embodiments in which this feature is enabled for all approval requests (or for a given request, as specified in the associated approval template), if not enough responses to a given approval request are received from the members of the approval group associated with the given approval request to be able to determine whether the request should be approved or denied within a pre-determined time period, the approval request may be escalated to the next approval level in the sequence of approval levels defined in the associated approval template (assuming one exists). In some embodiments, the approval service may support an auto-expiration feature. In embodiments in which this feature is enabled for all approval requests (or for a given request, as specified in the associated approval template), if the result of an approval request has not been determined within a pre-determined time period (e.g., based on the approval scheme defined by the associated approval template at one or more approval levels and the responses submitted by the members of one or more associated approval groups), the approval service may be configured to assign a default result for the approval request. As described in more detail below, the default result assigned to an approval request may be fixed for all approval requests, or may be dependent on the request type and/or the criteria specified in the associated approval template, in different embodiments.

In various embodiments, the approval service may present (through various administrator, management, or end user consoles) user interfaces through which approval templates, approval groups, and/or associations between approval templates, approval groups, and approval requests may be created and/or defined. FIG. 3A illustrates an example of the information presented to an IT administrator through a graphical user interface (GUI 300) of a service provider management console when creating an approval group that is to be managed by an approval service, according to at least some embodiments. As illustrated in FIG. 3A, other options presented to an IT administrator on behalf of the approval service may include an option to delete an approval group, create an approval template, delete an approval template, configure approval requests, generate and/or view reports (e.g., reports describing the association of approval groups and/or templates to approval requests, the state of various approval requests, or usage reports for reusable approval groups and/or templates), or view (and, in some cases, act upon) pending approval requests. As illustrated in this example, when creating the approval group, the IT administrator may provide input specifying one or more of: an approval group name (in this case, "Level 1 project managers"), an indication of the approval group owner or namespace (in this case, the account identifier for customer A), and/or an identity and access management policy (which is not specified for this approval group). In another example (e.g., one illustrated in FIG. 3B), the IT administrator may define an approval group for "Level 2 purchasing" approvers. In yet another example, the IT administrator may specify that the approval group includes root users only.

As illustrated in FIG. 3A, since the IT administrator has not specified an IAM role for the approval group, the IT administrator may provide input explicitly specifying the members of the customer organization that are to be members of the newly created approval group. In this example, the IT administrator has selected (using checkboxes) Charlie L., Dina B., Gerry G., Jenny B., and Larry M. as members of the approval group "Level 1 project managers". Once the selections illustrated in FIG. 3A have been made, the IT administrator may select an option to "Create and Continue", after which the IT administrator may be presented with information for creating an approval template or may be returned to the main page for the approval service. Note that when the approval group is created, the approval service may generate a unique resource identifier for the approval group, which may subsequently be included in approval requests that are directed to the approval group and/or in various APIs that perform actions on (or related to) the approval group.

FIG. 3B illustrates an example of the information presented to an IT administrator through GUI 300 when creating another approval group that is to be managed by an approval service, according to at least some embodiments. In this example, the IT administrator is creating an approval group with the name "Level 2 purchasing". As illustrated in FIG. 3B, the IT administrator may provide input implicitly identifying the members of the customer organization that are to be members of the newly created approval group by specifying roles that may be held by various members of the organization. In this example, the IT administrator has selected (using checkboxes) the roles "financial controller", "financial auditor", and "purchasing approver" as members of the approval group "Level 2 purchasing". In this case, any member of the customer organization having one or more of these roles is a member of the approval group "Level 2 purchasing". Once the selections illustrated in FIG. 3B have been made, the IT administrator may select an option to "Create and Continue", after which the IT administrator may be presented with information for creating an approval template or may be returned to the main page for the approval service. Note that when the approval group "Level 2 purchasing" is created, the approval service may generate a unique resource identifier for this approval group, which may subsequently be included in approval requests that are directed to the approval group and/or in various APIs that perform actions on (or related to) the approval group.

Figure 4B:

FIGS. 4A and 4B illustrate examples of the information presented to an IT administrator through a graphical user interface (GUI 400) of a service provider management console when creating an approval template that is to be managed by an approval service, according to at least some embodiments. As illustrated in FIG. 4A, when creating the approval group, the IT administrator may provide input specifying one or more of: an approval template name (in this case, "Two-level product access approval"), the number of approval levels that will be required for approval requests that are associated with the newly created approval template (in this case, two), and (optionally) a list of backend services that are potential sources of approval requests that will be subject to the approvals defined by the newly created approval template (in this case, an enterprise catalog service, a desktop application fulfillment service, and a resource stack management service). Once the selections illustrated in FIG. 4A have been made, the IT administrator may select an option to "Select & Continue", after which the IT administrator may be presented with additional information for specifying the approvals defined by the newly created approval template (such as the information shown in FIG. 4B).

FIG. 4B illustrates that, following the input of some initial information for the approval template being created, the IT administrator may define the specific voting strategies to be applied at each approval level of the newly created approval template. For example, for the first approval level defined for the named template (in this case, approval level 1 of the "Two-level product access approval" template), the IT administrator may specify one or more voting rules to be applied when determining if a particular approval request is to be approved or denied. In this example, the IT administrator has provide two rules (e.g., two rules that were selected from among multiple available options, not shown, that can be mixed and matched, where compatible). These rules specify that two "yes" votes (e.g., votes to approve a request) from members of the approval group associated with the request are required in order to approve a request, and that a single "no" vote (e.g., a single vote to deny a request by one of the members of the associated approval group) will result in denial of the request (e.g., regardless of the number of "yes" votes).

As illustrated in FIG. 4B, in some embodiments, the IT administrator may be able to specify which of several other optional features may be enabled (e.g., for this approval level) for the newly created approval template. In this example, the IT administrator has selected (e.g., using checkboxes) an option to pre-notify the members of the next approval level, and an option to automatically escalate an approval request to the next approval level if it has not been approved or denied at approval level 1 within a pre-determined time period (e.g., if not enough members of the associated approval group have voted within the specified time period to be able to determine that the request should be approved or denied). More specifically, the IT administrator has selected an auto-escalation period of twelve hours, although the auto-escalation period may be configurable by the IT administrator (e.g., using a pull-down menu, by entering a time period in a text entry box, or using another input mechanism of the user interface). Another optional feature that may be enabled by the IT administrator, in this example, include an option to allow approval requests to expire after a pre-determined time period if no decision has been reached in that time period (e.g., twenty-four hours, or another pre-determined time period that is configurable by the IT administrator using a pull-down menu, by entering a time period in a text entry box, or using another input mechanism of the user interface). As illustrated in this example, if an auto-expiration feature is selected by the IT administrator, the IT administrator may also be able to specify a default response for any approval requests that expire under this approval template. Note that while in some embodiments, the default response may be that expired approval requests are always denied, in other embodiments, the IT administrator may be able to specify that if the result of an approval request associated with this approval template (e.g., for level 1 approval or for final approval) has not been determined by the members of the approval group prior to the end of the expiration period, the request should be approved (e.g., at this level or for final approval, in different embodiments).

Note that in this example, because the approval template "Two-level product access approval" includes two approval levels, once the selections illustrated in FIG. 4B are made and the IT administrator elects to "Select & Continue", the IT administrator may be presented with another display that is similar to that depicted in FIG. 4B through which the IT administrator may define the voting strategy and optional features to be enabled for the second approval level. Note that the voting strategies and/or optional features selected for the second approval level may be different from those specified for the first approval level. In addition, the approval groups associated with each of the approval levels in the approval template "Two-level product access approval" may be different. Furthermore, the voting strategies, optional features, and approval groups associated with each of the approval levels in the approval template "Two-level product access approval" may be different for different approval requests. Note also that when the approval template is created, the approval service may generate a unique resource identifier for the approval template, which may subsequently be included in approval requests that are associated with the approval template and/or in various APIs that perform actions on (or related to) the approval template.

Figure 5A:
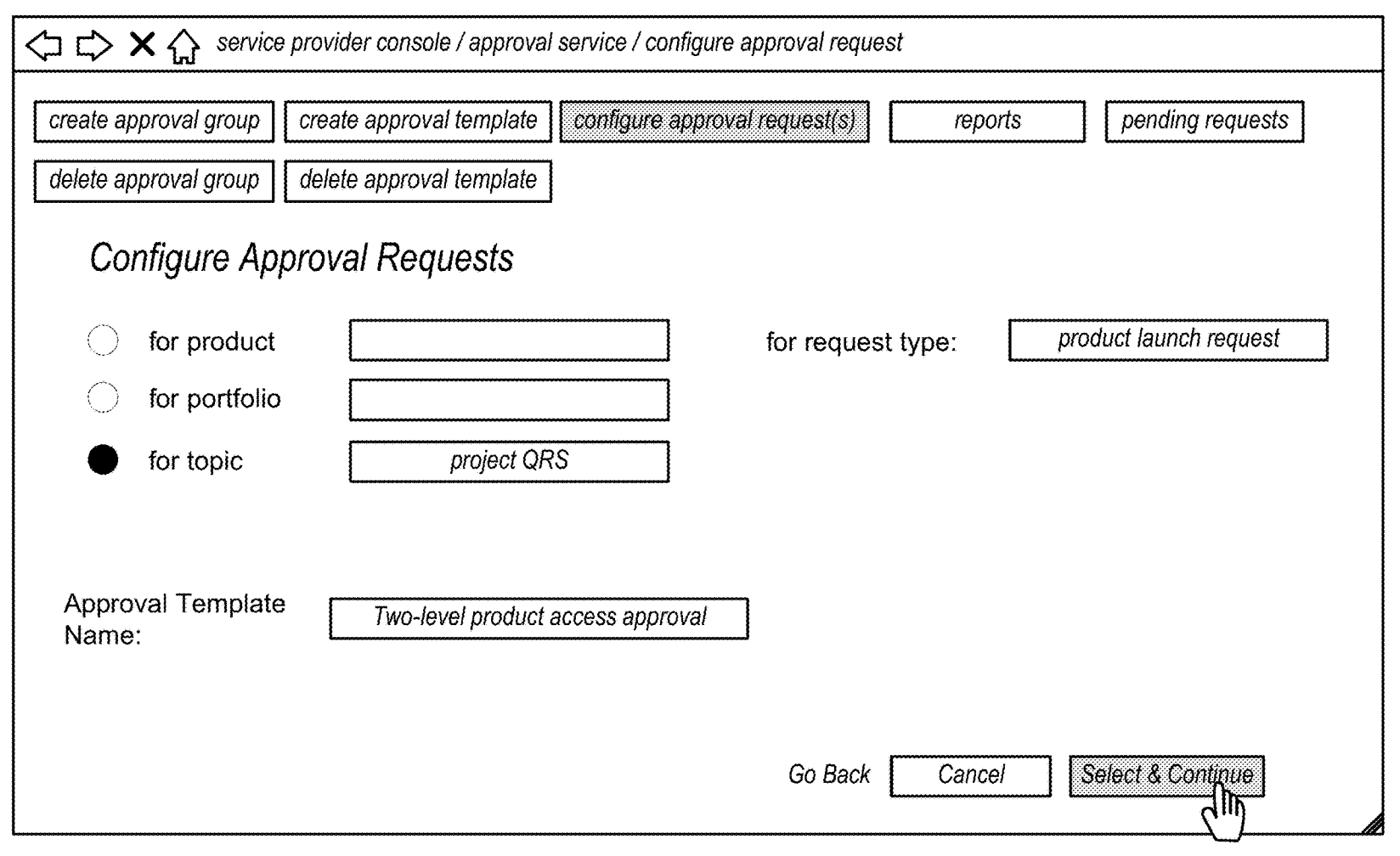
Figure 5B:
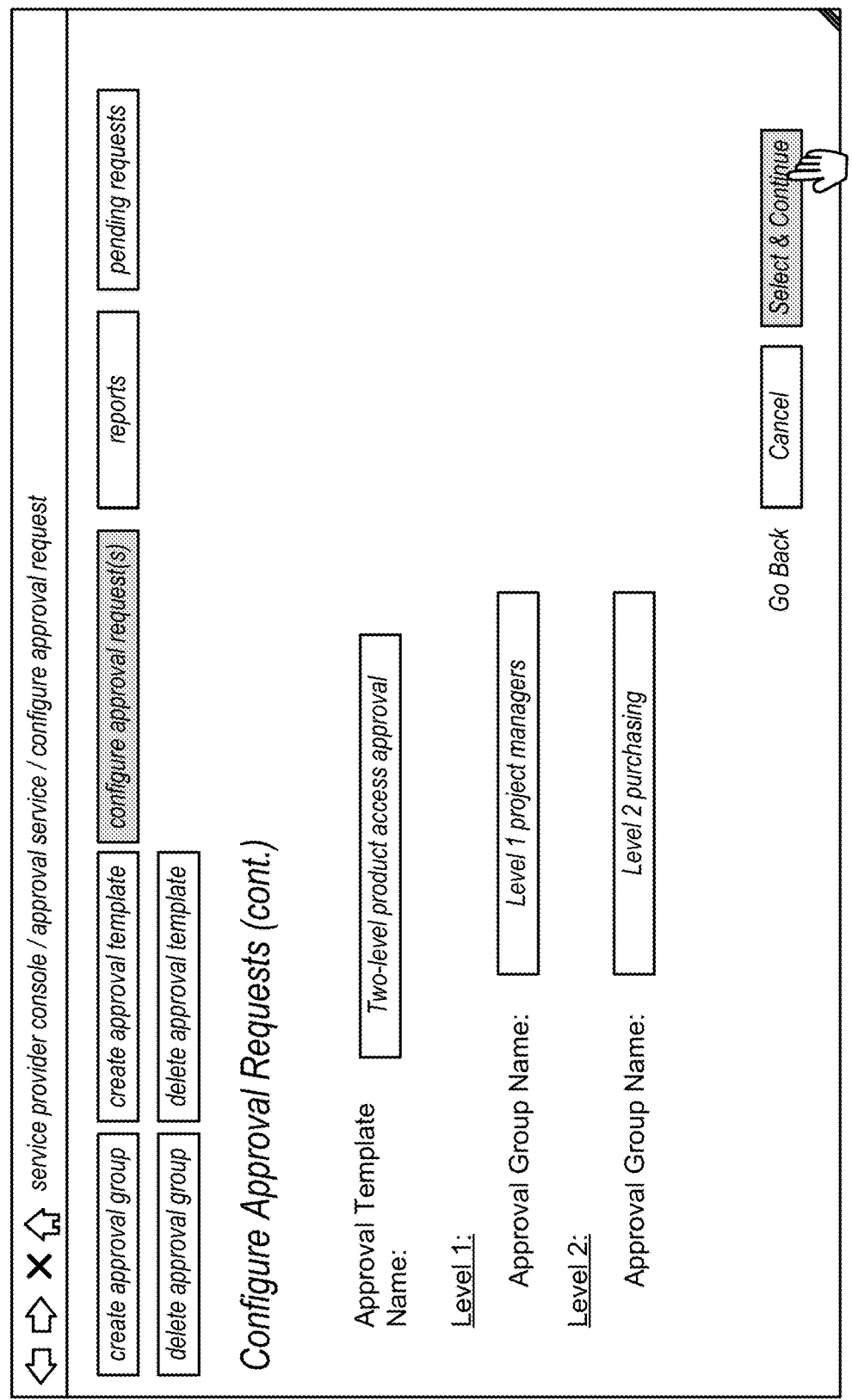
Figure 5C:
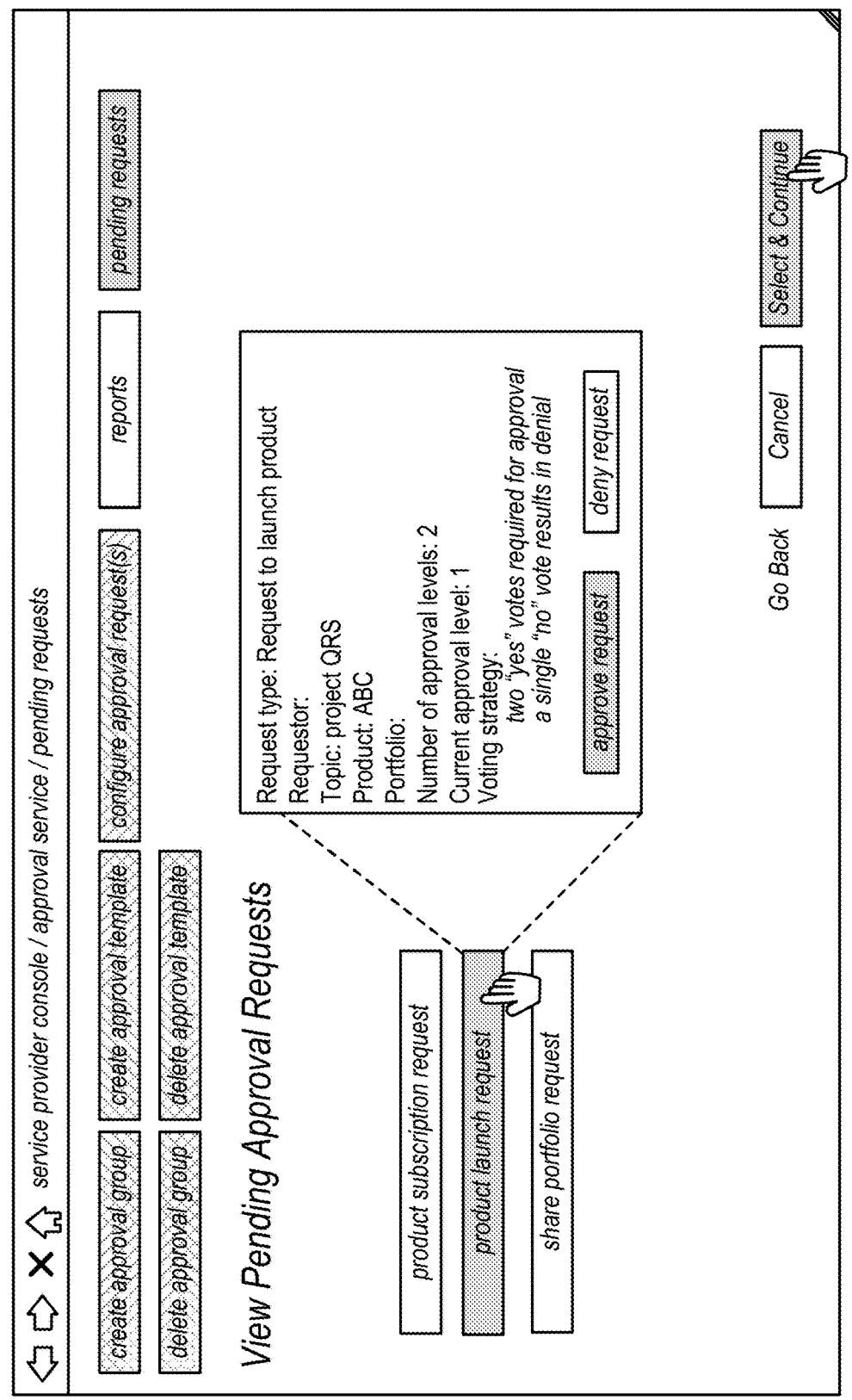

FIGS. 5A-5C illustrate examples of the information presented to an IT administrator through a graphical user interface (GUI 500) of a service provider management console when associating an approval group and/or an approval template to one or more approval requests and when viewing a resulting approval request, according to at least some embodiments. As described herein, approval templates and approval groups may be associated with various approval requests individually or by virtue of their association with a product, portfolio, project, message topic, workflow, and/or by request type. For example, approval templates and approval groups may be associated with particular objects (e.g., products, portfolios, etc.) and with particular actions to be taken on (or with respect to) those objects (e.g., where the available actions may be dependent on whether the approval templates and approval groups are associated with a product, a portfolio, etc.). In some embodiments, the IT administrator may (optionally) elect to associate a message topic with a particular approval template. In such embodiments, another service or utility may be configured to "listen" to the approval request messages that are exchanged between the approval service and one or more backend services and to subject approval request messages having this topic to the approval process(es) defined by the associated approval template. As illustrated in FIG. 5A, the IT administrator has, in this example, elected to configure approval requests (e.g., approval requests of a specific type) that are related to a particular topic (in this case, "project QRS"). As illustrated in this example, other options may include, but are not limited to, configuring approval requests for actions related to a given product, for actions related to a given portfolio of products (or the products, users who are authorized to access the products, and/or constraints placed on the use of those products), again, for particular request types (e.g., requests to view, install, update, or launch a product, to import a portfolio, or to share a portfolio with other administrators or users), in different embodiments. In this example, the IT administrator has selected the approval template "Two-level product access approval" to be associated with approval requests of the type "product launch request" that are related to the topic "project QRS".

Once the selections illustrated in FIG. 5A are made and the IT administrator elects to "Select & Continue", the IT administrator may be presented with another display (shown in FIG. 5B) through which the IT administrator may specify the respective approval groups for each approval level defined in the approval template "Two-level product access approval". As illustrated in FIG. 5B, the IT administrator has selected (e.g., using a pull-down menu, by entering an approval group name in a text entry box, or using another input mechanism of the user interface) the approval group "Level 1 project managers" as the approval group whose members are authorized to provide responses to the approval requests related to the topic "project QRS" at the first approval level defined by the approval template "Two-level product access approval". In addition, the IT administrator has selected the approval group "Level 2 purchasing" as the approval group whose members are authorized to provide responses to the approval requests related to the topic "project QRS" at the second approval level defined by the approval template "Two-level product access approval". Again note that the voting strategies that are applied at the first and second approval levels may be different (as specified by the approval template). Also note that if the approval template had included more than two approval levels, the IT administrator may have been presented with the option to select a respective approval group for each additional approval level.

Once the selections illustrated in FIG. 5B have been made and the IT administrator elects to "Select & Continue", the approval system may store information associating the approval template "Two-level product access approval", and the approval groups "Level 1 project managers" and "Level 2 purchasing" with approval requests related to the topic "project QRS". In some embodiments, when such an association is created, the approval service may generate a unique resource identifier for that association, which may subsequently be included in approval requests that are bound by this association and/or in various APIs that perform actions on (or related to) this association.

FIG. 5C illustrates an example of the information presented to a member of the approval group "Level 1 project managers" through a graphical user interface of a service provider management console when viewing an approval request of the type that was configured by the actions illustrated in FIGS. 5A and 5B, according to at least some embodiments. As illustrated in this example, this member of the approval group "Level 1 project managers" has elected to view one or more approval requests that they are authorized to view and/or respond to through the selection of the user interface element "pending requests" near the top right corner of GUI 500. In response to selection of this user interface element, a list containing three pending approval requests is presented, and the approver has elected to view a pending request referred to as "product launch request" (which may refer to a request type or to a description or an identifier of a specific request).

In response to selection of the list element "product launch request", more details about the selected approval request are presented. As illustrated in this example, in some embodiments, this information may include one or more of: a request type (in this case, "Request to launch product"), a Requestor (in this case, not specified), a Topic (in this case, "project QRS"—hence the application of approval template "Two-level product access approval"), a Product (in this case, "ABC"), a Portfolio (in this case, not specified), the number of approval levels for this request (in this case, two), the Current approval level (in this case, level 1—hence the association with the approval group "Level 1 project managers", as defined in the approval template "Two-level product access approval"), and a description of the voting strategy (again, as defined for the first level approval in the approval template "Two-level product access approval"). In this example, the information presented includes two available actionable user interface elements, one for approving the request and one for denying the request. In this case, the approver has elected to approve the request. Once the approver has made this selection and elected to "Select & Continue", the response may be submitted to the approval system and the approval system may store information recording the response made by this approver for this request, after which the approver may be presented with other options on the same user interface display or on another display, in different embodiments. Note that since this approval request is subject to a two-level approval process, once two approvers on level 1 (e.g., two members of the approval group "Level 1 project managers") have approved the request, the approval group for the next level approval (e.g., the members of the approval group "Level 2 purchasing") may be notified that the approval request is pending for their response (e.g., if they have not already been pre-notified about this approval request, as described below).

As illustrated in FIG. 5C, in some embodiments, not all approvers may be able to perform all of the approval service asks that are available to IT administrators or other privileged users through the service provider console. In this example, the options "create approval group", "delete approval group", "create approval template", "deleted approval template', and "configure approval request(s)" include hash marks and are not selectable by the approver (who may be a team leader or project manager, rather than an IT administrator or other privileged user) because the approver does not have permission to perform those tasks.

As previously noted, in some embodiments, approval requests of certain types and/or approval requests for which there are serious implications and/or high costs associated with granting or denying the approval request may require the approval of particular members of a customer organization or approval group, For example, there may be a requirement that the Chief Technology Officer must approve the acquisition of all new software products or the importing of a portfolio or constraint from another organization on behalf of the customer organization, or the sharing of portfolios, constraints, or other information created by the customer organization, in addition to any other approval criteria specified in the associated approval template. In another example, there may be a requirement that the Chief Financial Officer or another high-ranking member of the management team (e.g., a Director or Partner) must approve any approval request for which the cost of approval is greater than $10,000. In different embodiments, these types of additional approval requirements may be specified within the approval templates that are associated with various approval requests, or may be enforced by the approval service regardless of whether or not they are specified in the approval templates that are associated with any approval requests.

Figure 6:
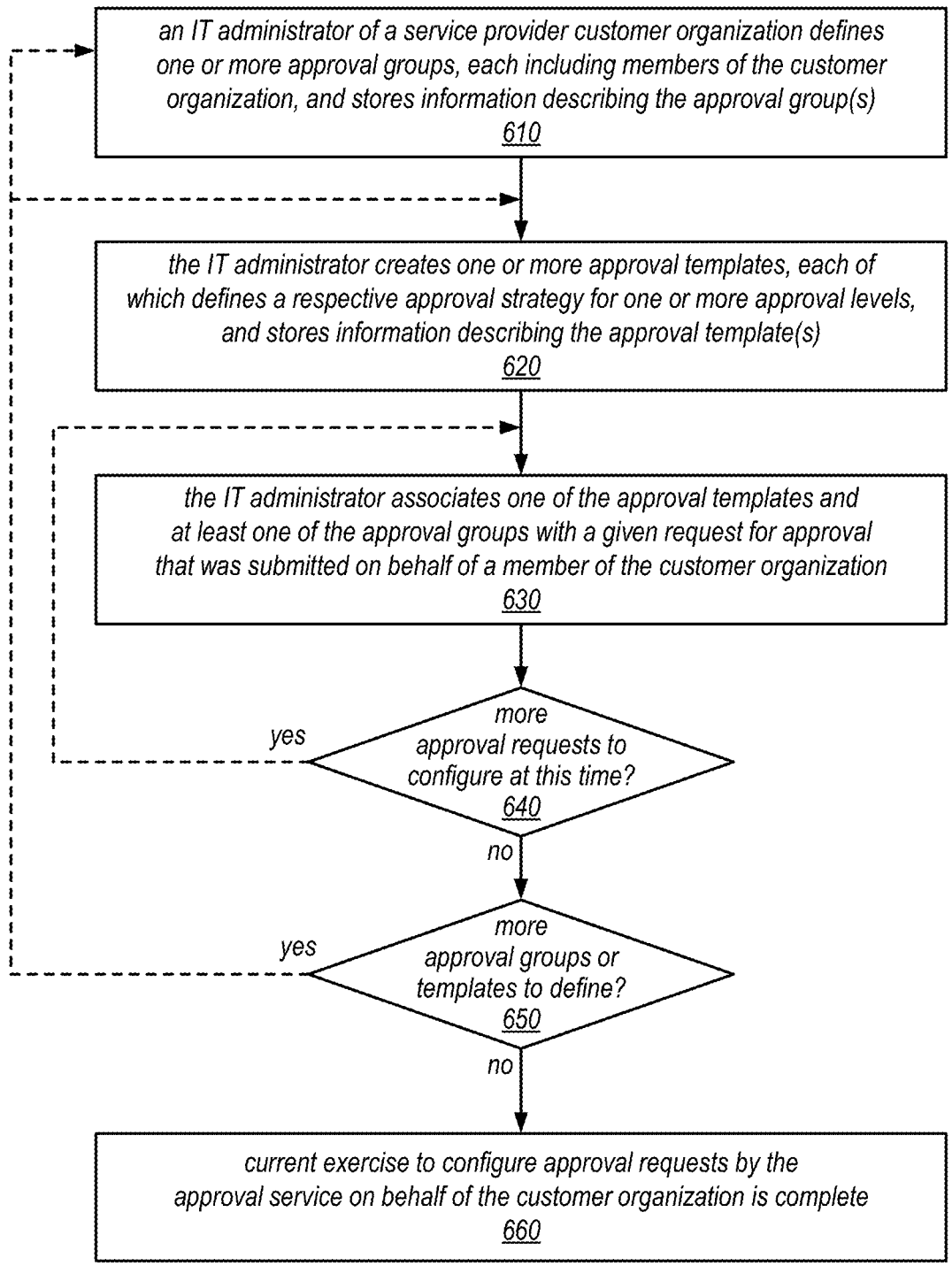
FIG. 6 is a flow diagram illustrating one embodiment of a method for creating approval groups and approval templates.

One embodiment of a method for creating approval groups and approval templates is illustrated by the flow diagram in FIG. 6. As illustrated at 610, in this example, the method may include an IT administrator of a service provider customer organization defining one or more approval groups, each including one or more members of the customer organization, and storing information describing the approval group(s). For example, the IT administrator may create an approval group specifically to define the members of the customer organization who are authorized to retrieve and respond to a specific approval request, or to define the members of the customer organization who are authorized to retrieve and respond to approval requests related to specific product, portfolio, project, action, message topic, workflow, or request type. In other embodiments, the IT administrator may create a reusable approval group that may be subsequently associated with various individual approval requests, or to products, portfolios, projects, actions, message topics, workflows, or request types. The method may also include the IT administrator creating one or more approval templates, each of which defines a respective approval strategy for one or more approval levels, and storing information describing the approval template(s), as in 620. For example, the IT administrator may create an approval template specifically to define the voting strategy for determining the result of a specific approval request, or to define the voting strategy for determining the results of approval requests related to specific products, portfolios, projects, actions, message topics, workflows, or request types. In other embodiments, the IT administrator may create a reusable approval template that may be subsequently associated with various individual approval requests, or to products, portfolios, projects, actions, message topics, workflows, or request types.

As illustrated in this example, the method may include the IT administrator associating one of the approval templates and at least one of the approval groups with a given request for approval that was submitted on behalf of a member of the customer organization, as in 630. For example, individually, or by associating them with a product, portfolio, project, action, message topic, workflow, or request type that is a subject or target of the request. If there are more approval requests to configure at this time (shown as the positive exit from 640), e.g., individually, or by associating them with a product, portfolio, project, action, message topic, workflow, or request type, the method may include repeating the operations shown in element 630 in order to associate one of the approval templates and at least one of the approval groups with one or more other requests for approval. This is illustrated in FIG. 6 by the dashed lines from the positive exit of 640 to 630. Note that, in this case, any of the templates and/or approval groups created (so far) on behalf of the customer organization may be reused in any combination. In other words, the same approval template, different approval templates, the same approval group(s), or different approval group(s) may be associated with each additional approval request (e.g., at one or more respective approval levels).

As illustrated in this example, if there are no additional approval requests to configure at this time (using the available approval groups and approval templates), shown as the negative exit from 640, but there are more approval groups and/or approval templates to be defined at this time, shown as the positive exit from 650, the method may include repeating any or all of the operations shown in elements 610-640 to create one or more additional approval groups and/or approval templates, and to associate them with various requests for approval. This is illustrated in FIG. 6 by the dashed lines from the positive exit of 650 to 610 and 620. Note that, in this case, the method may include creating new template and/or approval group(s) for a particular request or for a specific product, portfolio, project, action, message topic, workflow, or request type, after which these new approval groups and/or new approval templates may be associated (in combination with each other or with previously created approval groups and/or approval templates) with other approval requests (e.g., individually, or by associating them with a product, portfolio, project, action, message topic, workflow, or request type).

If (or once) there are no additional approval groups or templates to define (at this time), shown as the negative exit from 650, the current exercise to configure approval requests by the approval service on behalf of the customer organization may be complete, as in 660. Note, however, that the IT administrator may subsequently create more approval groups and/or more approval templates, and/or may associate new and/or previously defined approval groups and approval templates with other approval requests at any time and in any order, as appropriate to manage approval requests on behalf of the customer organization.

Figure 7:
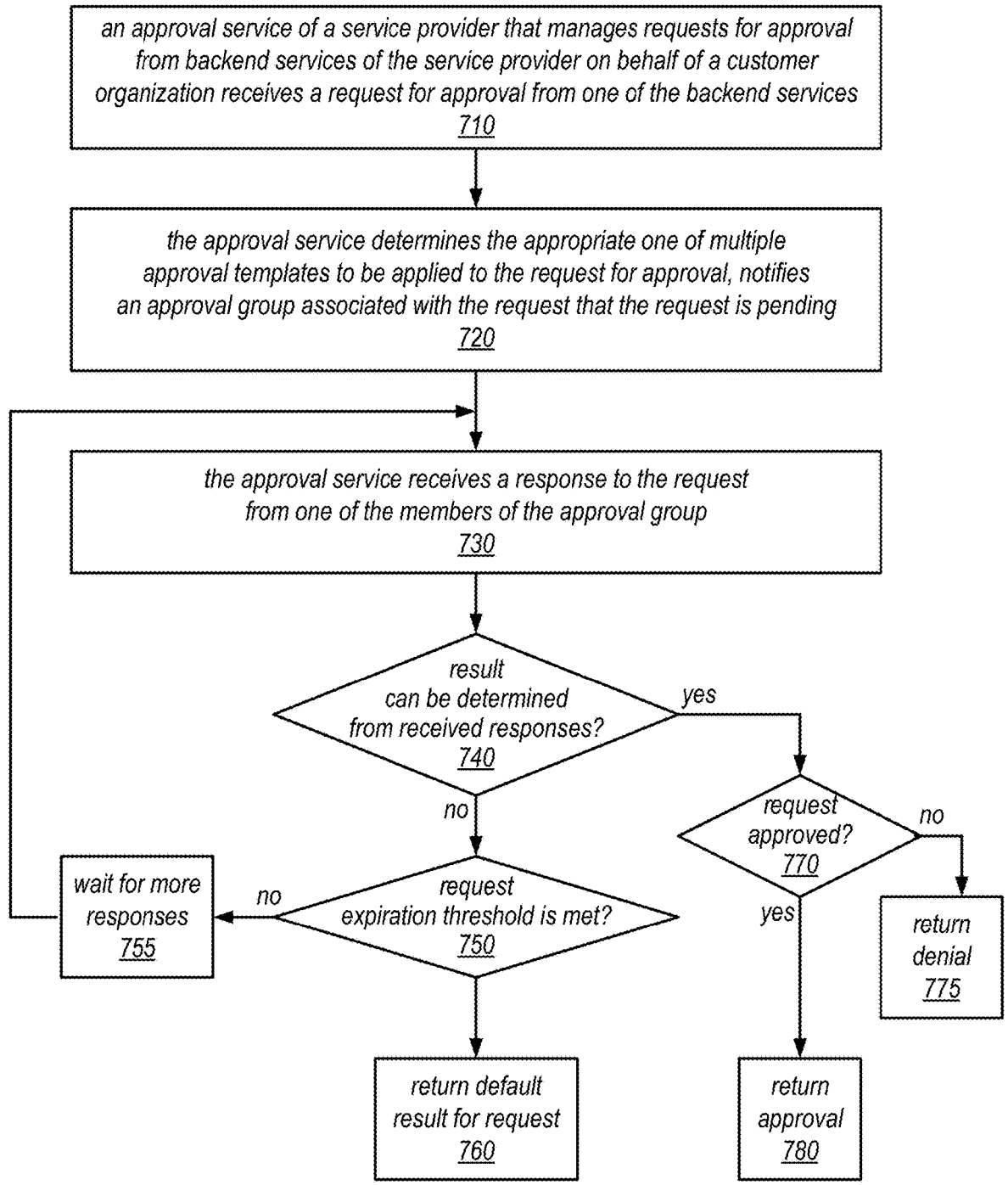
FIG. 7 is a flow diagram illustrating one embodiment of a method for handling an approval request that is subject to a single-level approval template.

One embodiment of a method for handling an approval request that is subject to a single-level approval template is illustrated by the flow diagram in FIG. 7. As illustrated at 710, in this example, the method may include an approval service of a service provider that manages requests for approval from backend services of the service provider on behalf of a customer organization receiving a request for approval from one of the backend services. The method may include the approval service determining the appropriate one of multiple approval templates to be applied to the request for approval (e.g., based on an association between the approval template and the request for approval that was defined by an IT administrator in the customer organization), and notifying an approval group that was associated with the request (e.g., by the IT administrator) that the request is pending, as in 720.

As illustrated in this example, the method may include the approval service receiving a response to the request from one of the members of the approval group, as in 730. If the result cannot be determined from the received response according to a voting strategy defined in the approval template for this single-level approval process (shown as the negative exit from 740), and if a request expiration threshold (e.g., a maximum time limit for receiving responses to the approval request) has not yet been met (shown as the negative exit from 750), the method may include waiting for more responses (as in 755) and repeating the operations illustrated as 730-750, as appropriate, for one or more additional responses. However, if the result cannot be determined from the received responses according to a voting strategy defined in the approval template (for this single-level approval process (shown as the negative exit from 740), and if such a request expiration threshold has been met (shown as the positive exit from 750), the method may include returning a default result for the request, as in 760.

Note that, in various embodiments, the default result of an approval request may be fixed for all requests or may be dependent on the request type and/or the associated approval template (e.g., it may be dependent on the voting strategy defined by the approval template). For example, if the voting strategy for a particular approval request is defined such that a single approver can deny the request and multiple positive responses are required to approve it, and if one or more approvers (but fewer than required) have approved the request, but no approver has denied it, the default result may be to approve the request. On the other hand if the voting strategy for a particular approval request is defined such that multiple approvals are required, but no positive responses have been received, the default response may be to deny the approval request. In other embodiments, the default result may be dependent on the request type. For example, for some approval request types (e.g., those involving the sharing of information outside the organization, the importing of information from outside the organization, or the purchase of resources or services), all requests may be denied if the specified approval criteria is not met prior to the expiration of the approval request.

As illustrated in FIG. 7, if, or once, the result can be determined from the received response(s), according to a voting strategy defined in the approval template for this single-level approval process (shown as the positive exit from 740), and if the request is approved (shown as the positive exit from 770), the method may include returning an indication that the request was approved, as in 780. However, if (or once) the result can be determined from the received response(s), according to the voting strategy defined in the approval template for this single-level approval process (shown as the positive exit from 740), but the request is not approved (shown as the negative exit from 770), the method may include returning an indication that the request was denied, as in 775. Note that while FIG. 7 illustrates an example in which the approval request is subject to a single level approval process, in other embodiments, the approval template associated with an approval request may define multiple approval levels. In such embodiments, a process similar to that illustrated in FIG. 7 may be applied to each of the other approval levels, in sequential order, as defined by the associated approval template.

Note that, in some embodiments, once a result has been determined (from the received responses or by default after the expiration of the request for approval), any responses received subsequent to that determination may be blocked or ignored by the approval service. In other words, in some embodiments, responses that are submitted by members of the approval group after a result has been determined will not change the result, regardless of whether or not they would have changed the result had they been received prior to its determination. In some such embodiments, once a result has been determined, the state of the request may be changed to reflect that responses are no longer being accepted, the request may be recalled, cancelled, or otherwise removed from the view of the members of the approval group, a notification may be sent to the members of the approval group indicating that the result has been determined and/or that responses are no longer being accepted, or a reply may be sent to a member of the approval group attempting to submit a response indicating that it is too late to submit a response. Note also that, in some embodiments, a request for approval may be withdrawn by the requestor (e.g., by an end user or by a service through which the request was submitted on behalf of an end user). In such cases, any responses that are subsequently submitted by a member of the associated approval group may be similarly blocked or ignored.

Figure 8:
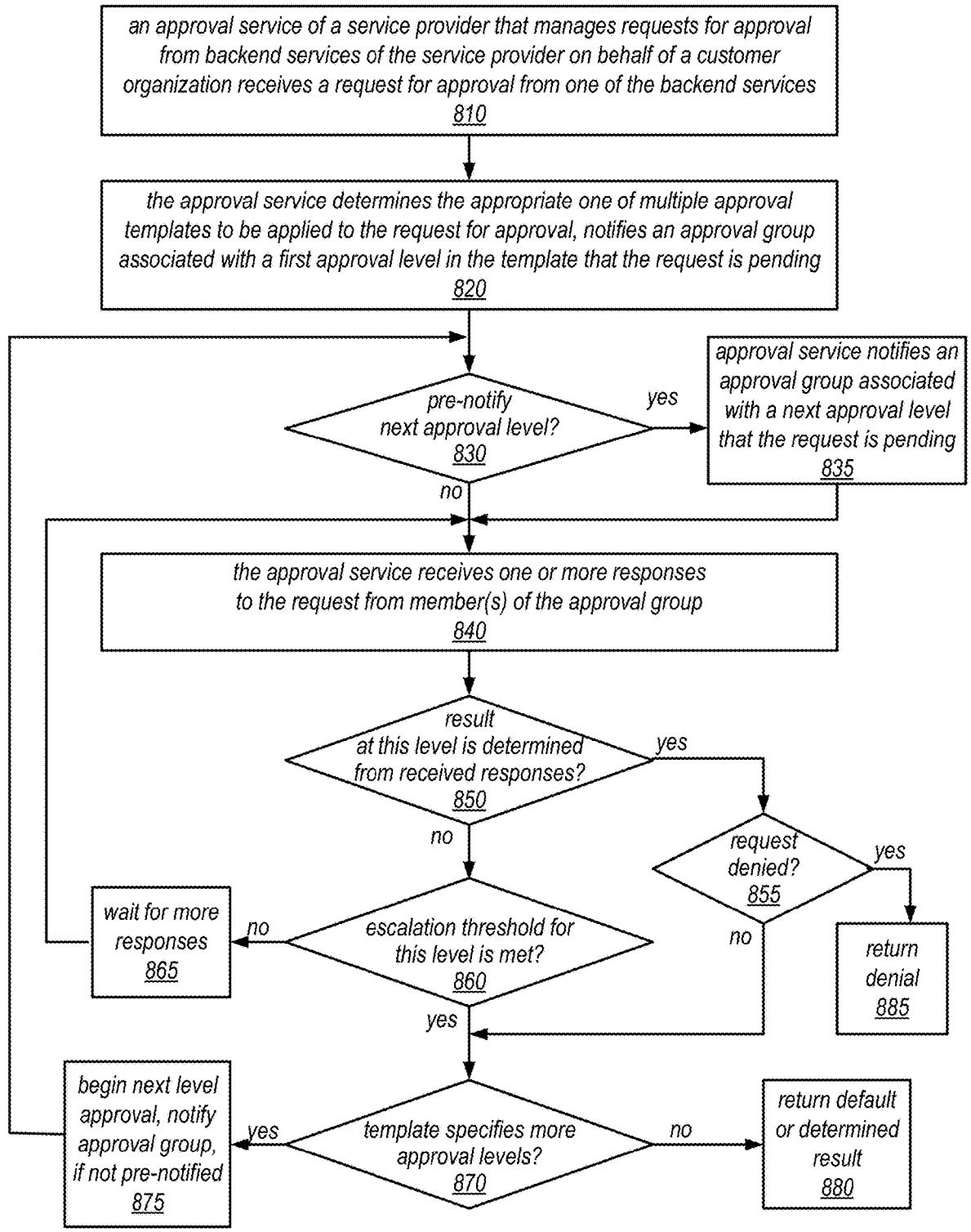
FIG. 8 is a flow diagram illustrating one embodiment of a method for handling an approval request that is subject to a multiple-level approval template.

One embodiment of a method for handling an approval request that is subject to a multiple-level approval template is illustrated by the flow diagram in FIG. 8. As illustrated at 810, in this example, the method may include an approval service of a service provider that manages requests for approval from backend services of the service provider on behalf of a customer organization receiving a request for approval from one of the backend services. The method may include the approval service determining the appropriate one of multiple approval templates to be applied to the request for approval (e.g., based on an association between the approval template and the request for approval that was defined by an IT administrator in the customer organization), and notifying an approval group that was associated with a first approval level in the template (e.g., by the IT administrator) that the request is pending, as in 820. If a pre-notification feature is applicable (shown as the positive exit from 830), e.g., if a pre-notification feature supported by the approval service and enabled for this request, and if there is at least one additional level defined by the approval template, the method may also include the approval service notifying an approval group that was associated with a next approval level in the template (e.g., by the IT administrator) that the request is pending, as in 835. If no pre-notification feature is applicable in this case (shown as the negative exit from 830), the operation illustrated in 835 may be elided.

As illustrated in this example, the method may include the approval service receiving one or more responses to the request from respective ones of the members of the approval group, as in 840. If the result of the request (at this approval level) can be determined from the responses received so far (shown as the positive exit from 850), and if the request is denied (shown as the positive exit from 855), the method may include returning an indication that the request for approval has been denied (as in 885). On the other hand, if the result of the request (at this approval level) can be determined from the responses received so far (shown as the positive exit from 850), and if the request is approved at this approval level (shown as the negative exit from 855), the approval process for this level may be complete. In this case, if the template specifies one or more additional approval levels (shown as the positive exit from 870), the method may include beginning the next level approval process (as in 875), which may include notifying the members of another approval group (one associated with the next level approval process), if they have not already been pre-notified. In this case, the method may include repeating some or all of the operations illustrated as elements 830-870 in FIG. 8, as applicable, for each additional approval level. On the other hand, if no additional approval levels are specified in the template, shown as the negative exit from 870, the method may include returning the determined result (as in 880).

As illustrated in this example, if the result of the request (at this approval level) cannot be determined from the responses received so far (shown as the negative exit from 850), and if an escalation threshold for this level (e.g., a maximum time limit for receiving responses to the approval request before escalating the approval request to the next approval level, if one exists) has not yet been met (shown as the negative exit from 860), the method may include waiting for one or more additional responses (as in 865). In this case, the method may include repeating some or all of the operations illustrated as elements 840-860 until the result can be determined for this level or until the escalation threshold is met. This is illustrated in FIG. 8 by the feedback from 865 to 840. Note that if a result is subsequently determined for this level, the method may continue beginning with the positive exit from 850, as described above.

As illustrated in FIG. 8, if (or once) the escalation threshold is met (shown as the positive exit from 860), assuming the result of the request at this approval level has still not been determined, and if the template specifies one or more additional approval levels (shown as the positive exit from 870), the method may include beginning the next level approval process (as in 875), which may include notifying the members of another approval group (one associated with the next level approval process), if they have not already been pre-notified. In this case, the method may include repeating some or all of the operations illustrated as elements 830-870 in FIG. 8, as applicable, for each additional approval level. On the other hand, if no additional approval levels are specified in the template, shown as the negative exit from 870, the method may include returning a default result (as in 880). As previously noted, the approval template may, in some embodiments, define a different voting strategy for each approval level.

Note that, as was the case in the example illustrated in FIG. 7, in some embodiments, once a result has been determined at a particular approval level (from the received responses or by default after the expiration of the request for approval), or once the request for approval has been escalated to a higher approval level, any responses received from members of the approval group associated with the particular approval level subsequent to that determination may be blocked or ignored by the approval service. In other words, in some embodiments, responses that are submitted by members of an approval group after a result has been determined at the approval level with which the approval group is associated will not change the result at that approval level, regardless of whether or not they would have changed the result had they been received prior to its determination or the escalation of the request for approval. In some such embodiments, once a result at a particular approval level has been determined (or the request has been escalated), the state of the request may be changed to reflect that responses are no longer being accepted for that approval level, the request may be recalled, cancelled, or otherwise removed from the view of the members of the approval group associated with that approval level, a notification may be sent to the members of the approval group associated with that approval level indicating that the result has been determined for that approval level and/or that responses are no longer being accepted for that approval level, or a reply may be sent to a member of the approval group associated with that approval level attempting to submit a response indicating that it is too late to submit a response. Note also that, as in the example illustrated in FIG. 7, a request for approval may be withdrawn by the requestor (e.g., by an end user or by a service through which the request was submitted on behalf of an end user). In such cases, any responses that are subsequently submitted by members of the approval groups associated with any of its approval levels may be similarly blocked or ignored.

As previously noted, in some embodiments, the approval service may generate a unique resource identifier for each of the approval templates, approval groups, and/or associations between approval templates, approval groups, and approval requests (or groups thereof) that are created on behalf of a customer or customer organization, and these unique resource identifiers may subsequently be included in various APIs that perform actions on (or related to) those approval templates, approval groups, and/or associations. Similarly, each approval request that is created by a customer or member of a customer organization (or by another service on behalf of a customer or member of a customer organization) and that is received by the approval service may be assigned a unique resource identifier (e.g., by the service that creates it, or by the approval service upon receiving it). In some embodiments, such identifiers may be included in a record of their association with an approval template (and its unique resource identifier) and one or more approval groups (and their unique resource identifiers), and used by the approval service to parse and evaluate the approval schemes that have been defined for the approval requests.

As previously noted, the service provider systems described herein may, in some embodiments, implement a notification service that handles actionable notification messages on behalf of other services (some of which may represent or include approval requests). For example, the notification service (which may sometimes be referred to herein as an "inbox service") may allow various service provider services to send targeted, actionable messages to service consumers (e.g., administrators or end users within a service provider customer organization). The notification service may define the notion of an "inbox" (e.g., an inbox defined and/or created by a customer or service) as a target for such messages. The inbox service may allow administrators to define who has access to various messages and where notifications are sent when messages arrive in a particular inbox.

In some embodiments, the approval services described herein may employ such a notification service to manage actionable notification messages that include approval requests. In such embodiments, members of various approval groups may retrieve approval requests from specific message inboxes and may respond to them by selecting one of several available actions. For example, an IT administrator may (on behalf of a service provider customer organization) create one message inbox per approval group. In this example, when an actionable notification message is received by the notification service (e.g., in response to an administrator or end user taking or initiating an action that requires approval), and that actionable notification message includes an approval request directed to a particular approval group, the actionable notification message may be posted to the corresponding message inbox, and the members of the approval group may be notified that the approval request has been received.

As noted above, an approval request may be subject to a particular approval template that defines the approval scheme, the number and/or sequence of approval levels (each of which may be associated with a different approval group), and the voting strategy for each approval level (which may be different for different levels). In the case of a multiple-level approval scheme, when an approval request is received, it may be posted to the message inbox corresponding to the approval group for the first approval level (and, if a pre-notification feature is enabled, to the message inbox corresponding to the approval group for the second approval level). In this example, when and if the approval request is approved at one approval level (or if it is escalated to another level due to an auto-escalation feature), it may be posted to the message inbox(es) corresponding to the approval group(s) for the one or more additional approval levels.

As described in more detail herein, in some embodiments, access to an inbox that was created on behalf of a customer may be managed by that customer via identity and access management (IAM) policies (e.g., based directly on their IAM users and roles and/or as defined by a resource-level policy on the inbox itself). The other services (e.g., services that are, essentially, clients or "customers" of the notification service) may have the ability to create and manage actionable notification messages through the notification service and may be responsible for managing the lifecycle of the actionable notification messages they create. For example, a service that creates an actionable notification message (which may sometimes be referred to herein as a "backend service") may be responsible for determining the state of the actionable notification message, determining when it the actionable notification message is no longer relevant, when it can be designated as "inactive" and/or when it can be deleted. The backend service may send updates to the notification service to indicate these and other state changes for the actionable notification messages it created.

The notification services described herein may, in different embodiments, receive, store, and dispatch actionable notification messages that are received from any of a variety of backend services that are configured to interoperate with the notification service, e.g., any backend services that employ an application programming interface defined by the notification service for submitting actionable notification messages, updated state information for actionable notification messages, or other service requests related to the creation and management of one or more message inboxes on behalf of a customer. For example, an enterprise catalog service that provides a stream of change events for a product (such as when a new version of the product becomes available) may employ the techniques described herein to listen for these events and to target actionable notification messages to the specific set of end users that are using older versions of the product using a notification service such as those described herein. In this example, and in other backend services that are configured to interoperate with the notification service to manage actionable notification messages, the backend service may include a notification engine to inform users when a system event happens or when an action is required. The notification engine of the backend service may determine which users (and thus which of multiple message inboxes) to target and may associate an actionable item to a notification message that is dependent on the users' roles. For example, the roles of the users to whom an actionable notification message is directed may be that of developers, administrators, approvers, or any other roles defined by the customer. The actions associated with the roles may be determined by the permissions granted to the role (e.g., by an IT administrator). In some embodiments, by employing the notification services and techniques described herein, a user to whom a notification message is targeted may be presented with a logical set of actions to take, and those actions may be performed automatically in response to their selection by the user. In some embodiments, once an action selected by the user has been performed, the backend service from which the actionable notification message originated may update its state with the notification service.

Figure 9:
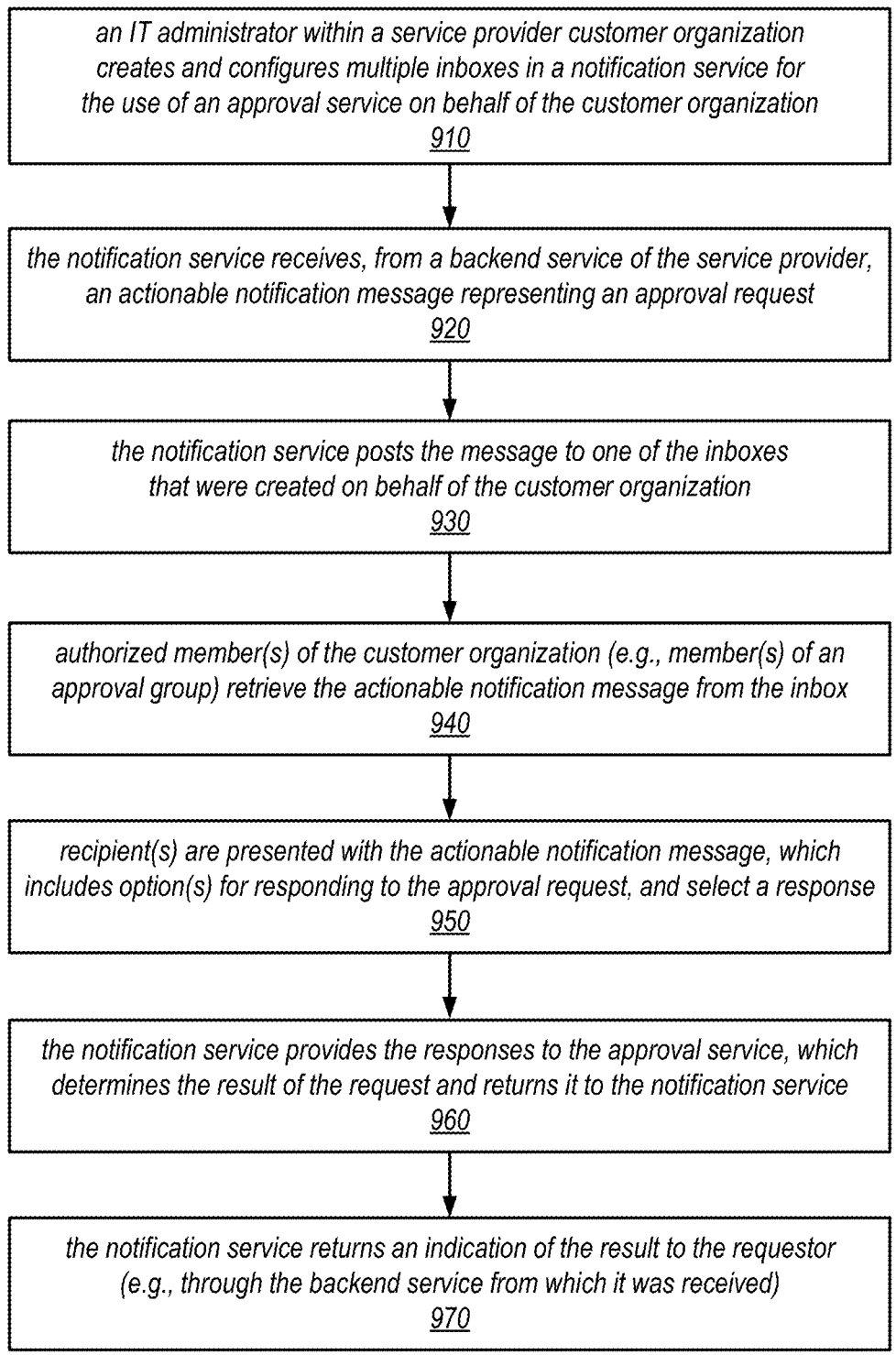
FIG. 9 is a flow diagram illustrating one embodiment of a method for utilizing a notification service to manage actionable notification messages from backend service of a service provider.

One embodiment of a method for utilizing a notification service to manage actionable notification messages from backend service of a service provider is illustrated by the flow diagram in FIG. 9. As illustrated at 910, in this example, the method may include an IT administrator within a service provider customer organization creating and configuring multiple inboxes within a notification service for the use of an approval service on behalf of the customer organization (e.g., one inbox per approval group). The method may also include the notification service receiving, from a backend service of the service provider, an actionable notification message representing an approval request, as in 920.

As illustrated in this example, the method may include the notification service posting the message to one of the inboxes that were created on behalf of the customer organization for subsequent retrieval by a member of the customer organization, as in 930 (e.g., the one for the approval group with which the request was associated by the IT administrator). The method may also include one or more authorized members of the customer organization (e.g., members of the approval group on whose behalf the inbox was created and configured) retrieving the actionable notification message from the inbox, as in 940. The method may also include presenting the actionable notification message (which includes one or more options for the recipients to respond to the approval request) to the member(s) of the customer organization who retrieved the message, as in 950, and each of the recipients selecting a respective response. For example, in some embodiments, the options for responding to an approval request may include one or more of: "approve", "deny" "temporarily deny", "temporarily approve", "permanently approve", "permanently deny", "abstain", or "request more information". In some embodiments, more, fewer, or different options for responding to an approval request may be supported in the system and included (in any combination) in actionable notification messages for respective approval requests.

As illustrated in this example, the method may include the notification service providing the responses to the approval service, which determines the result of the request (based on those responses) and returns the result to the notification service, as in 960. The method may also include the notification service returning an indication of the result to the requestor (e.g., through a console of the backend service from which it was received), as in 970.

Figure 10:
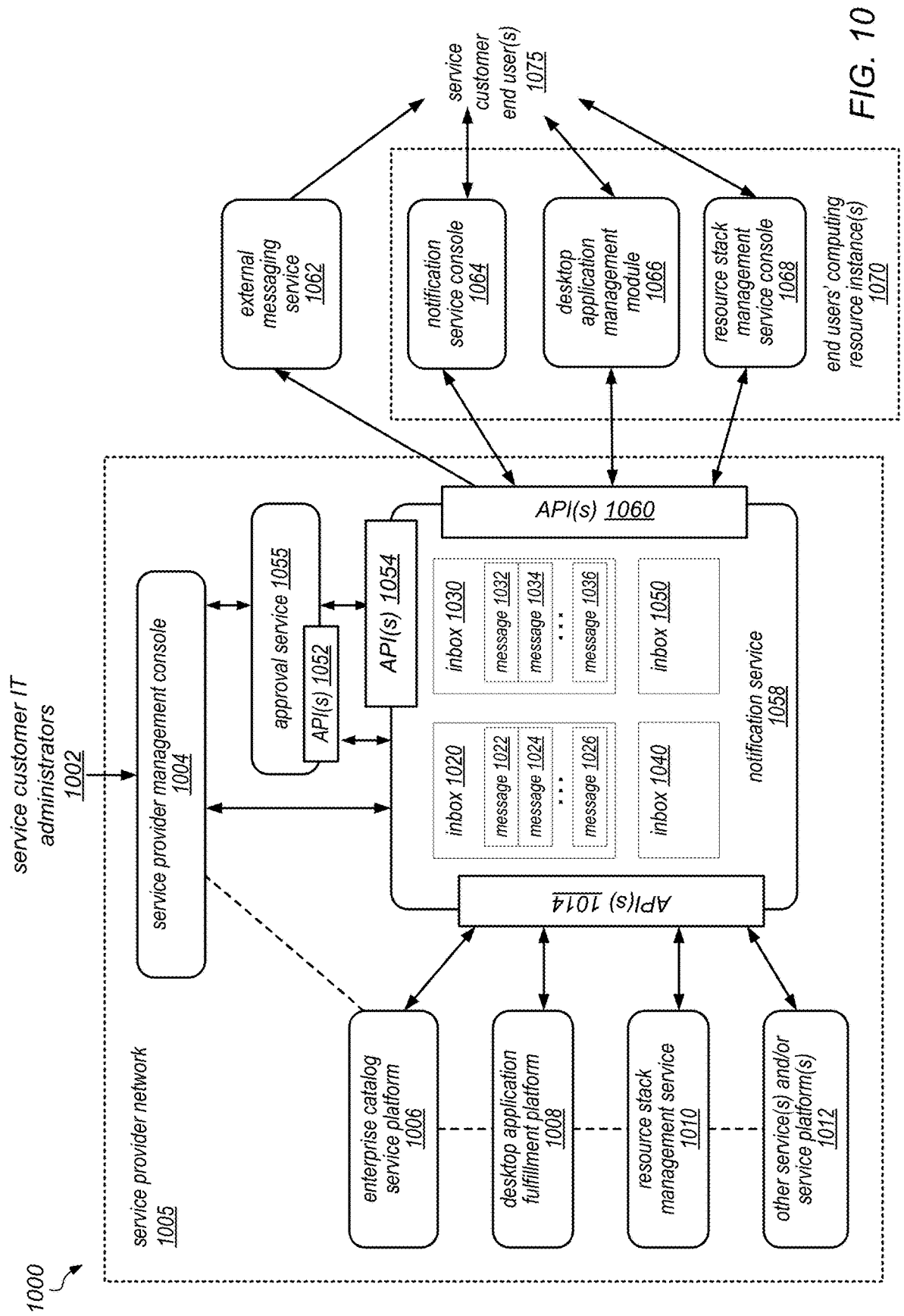
FIG. 10 is a block diagram illustrating one embodiment of a service provider system that is configured to implement a notification service that manages actionable notification messages on behalf of backend services of the service provider.

One embodiment of a service provider system that is configured to implement a notification service that manages actionable notification messages on behalf of backend services of the service provider is illustrated by the block diagram in FIG. 10 In this example, system 1000 includes, on a service provider network 1005, physical and/or virtualized computing resources that are configured to provide a variety of services for the IT administrators, buyers, and/or end users within a service provider customer (e.g., various members of a service provider customer organization). System 1000 also includes client-side components of at least some of these platforms and services that are implemented on various end users' computing resource instances 1070 (which may include physical computing devices and/or virtualized computing resource instances, some of which may be hosted on physical resources on service provider network 1005—not shown). In this example, servicer provider network 1005 includes an enterprise catalog system platform 1006, a desktop application fulfillment platform 1008, a resources stack management service 1010, and one or more other services and/or service platforms 1012, each of which is a customer of a notification service 1058. Note that in other embodiments, more, fewer, or different services provided to customer organizations and their end users (which may sometimes be referred to herein as "backend services" of the service provider or service provider network) may be customers of a notification system such as those described herein.

As described in more detail herein, each of service customer end users 1075 may receive one or more services from service provider network 1005 on whose behalf actionable notification messages are managed by notification service 1058. In the example illustrated in FIG. 10, an end user 1075 may consume or otherwise interact with at least some of those services through a dedicated client-side interface mechanism. For example, an end user 1075 may interact with desktop application fulfillment platform 1008 through desktop application management module 1066 in order to receive on-demand access to virtualized desktop application packages. In another example, an end user 1075 may interact with resources stack management service 1010 through resource stack management service console 1068 to receive access to various server products that run as services on service provider resources. In some embodiments, enterprise catalog service platform 1006 may provide access to (and/or licenses for) various server products and/or virtualized desktop application that it manages on behalf of the customer organization to end users 1075 through desktop application fulfillment platform 1008 (and/or desktop application management module 1066), resource stack management service 1010 (and/or resource stack management service console 1068) and/or other service(s) and/or service platforms 1012, but may not be directly accessible to end users 1075. Note, however, that in other embodiments, more, fewer, or different mechanisms may be provided to service customer IT administrators and/or end users for consuming or otherwise interacting with the services provided by service provider network 1005 (and the underlying resources and platforms thereof). For example, in some embodiments, two or more services provided by service provider network 1005 may be accessed by a service customer end user 1075 though a single end user module or console that is implemented on the end user's computing resource instance 1070. Note also that, in some embodiments, end users 1075 may not have access to notification service 1058 or approval service 1055 directly (e.g., through a dedicated client-side console such as notification service console 1064 illustrated in FIG. 10), but may access various inboxes that they are authorized to access through a user interface of a module or console for one of the backend services from which they receive services. In other embodiments, end users 1075 may have access to approval service 1055 through a dedicated client-side console (not shown). As illustrated in FIG. 10, notification service 1058 may provide various APIs 1060 through which end user consoles (such as those shown as 1064, 1066, and 1068) and/or an external messaging service (such as external messaging service 1062) interact with notification 1058 (e.g., to submit, retrieve, and/or respond to actionable notification messages).

In this example, IT administrators 1002 (and, in some cases, other privileged users) within the customer organization may access the notification service 1058 through a service provider management console 1004. As illustrated by the dashed lines between elements 1004, 1006, 1008, 1010, and 1012 in FIG. 10, IT administrators 1002 may also access one or more of the other services provided by service provider network 1005 through service provider management console 1004. In other embodiments, one or more of these other services may be accessed through a different interface mechanism than the one through which IT administrators 1002 interact with notification service 1058, such as through a dedicated interface module or browser application (e.g., a web page). Note that in some embodiments, a graphical user interface of the service provider management console 1004 may present different information and different views at different times in order for the IT administrator to manage desktop applications, server products, or product subscriptions (which may include product licenses); to generate and/or view reports (e.g., desktop application usage and/or server product deployment reports); to create and configure portfolios, or to add products, constraints, and users to portfolios; to search for products; and to view (and, in some cases, take action in response to) various notifications (e.g., from the backend services on whose behalf notification service 1058 stores, dispatches, updates, and/or otherwise manages those notifications).

In some embodiments, notification service 1058 may be configured to manage actionable notification messages that are created by various backend services and that are directed to IT administrators 1002 (and/or other privileged user) and end users 1075 who consume those backend services. For example, an IT administrator 1002 (e.g., through service provider management console 1004) or a backend service (e.g., through one of APIs 1014) request the creation of an inbox in which to post various actionable notification messages, after which a backend service may (through one of APIs 1014) submit an actionable notification message for posting to the inbox, request a change of state for the actionable notification message, or request information describing various inboxes and/or actionable notification messages that have been posted therein. In the example illustrated in FIG. 10, four such inboxes have been created for management by notification service 1058. These include inbox 1020 (which currently stores actionable notification messages 1022-1026), inbox 1030 (which currently stores actionable notification messages 1032-1036), inbox 1040 (which stores one or more actionable notification messages—not shown), and inbox 1050 (which stores one or more actionable notification messages—not shown). Each of the inboxes may be configured to store actionable notification messages that were submitted by a particular backend service, that are of a particular message type, or that are directed to particular users (to users having particular roles), in different embodiments.

In this example, an end user 1075 may receive (e.g., through notification service console 1064 or through a user interface of a module or console for one of the backend services from which they receive services, such as the backend service that initiated the actionable notification message) an alert or other indication when an actionable notification message is posted to an inbox that the end user is authorized to access, after which the end user 1075 may retrieve (and, in some cases, take action on) the actionable notification message (e.g., through notification service console 1064 or through a user interface of a module or console for one of the backend services from which they receive services, such as the backend service that initiated the actionable notification message). In some embodiments, notification service 1058 may employ an external messaging service (a client-side component of which is shown in FIG. 10 as external messaging service 1062) in order to alert an end user when an actionable notification message is posted to an inbox that the end user is authorized to access (e.g., through email or a text message). In response to receiving the alert, the end user may retrieve (and, in some cases, take action on) the actionable notification message (e.g., through notification service console 1064 or through a user interface of a module or console for one of the backend services from which they receive services, such as the backend service that initiated the actionable notification message).

As illustrated in this example, in some embodiments, system 1000 may include an approval service 1055, which may be similar to approval service 258 illustrated in FIG. 2 and the approval services described herein. In such embodiments, the approval service 1055 may employ notification service 1058 in managing various approval requests on behalf of the customer organization. For example, when an IT administrator or end user submits a request to view, install, update, or launch a product, to import a portfolio, or to share a portfolio with other administrators or users, this may initiate the performance of an approval workflow that includes the creation of an actionable notification message for a corresponding approval request, and that actionable notification message may be directed to an inbox that was created to manage approval requests that are directed to a particular approval group and/or that are associated with a particular product, portfolio, project, action, message topic, workflow, or request type. As illustrated in this example, the approval service 1055 and notification service 1058 may communicate with each other in accordance with various APIs 1054 (e.g., APIs of notification service 1058, which may be the same as, or different from, the APIs 1014 with which other services communicate with notification service 1058, in different embodiments) and/or APIs 1052 (e.g., APIs of approval service 1055 with which notification service 1058 communicates messages to approval service 1055, such as to carry out jointly implemented internal operations and functions). Note that IT administrators of customer organizations may interact with the approval service 1055 directly (e.g., though service provider management console 1004) and/or through the consoles of other services (such as the services illustrated as 1006, 1008, 1010, or 1012 in FIG. 10), in different embodiments.

Note that FIG. 10 illustrates a system 1000 that is configured to provide services to members of a single customer organization. However, in other embodiments, the notification system may be configured to manage actionable notification messages (some of which represent or include requests for approval) on behalf of multiple customers or customer organizations, each of which may create and configure their own inboxes for the actionable notification messages and/or approval requests that are received on their behalf from the backend services they consume.

As noted above, when a backend service creates an actionable notification messages, it may specify a specific inbox in which to store the message. The inbox itself may be controlled in one of several ways, in different embodiments. For example, in some embodiments, an IT administrator may determine which inboxes are valid for their customer organization. For example, within a customer's service provider account, the IT administrator may define one inbox for the use of all of the IT administrators in the organization, another one for a particular project development team, etc. In such embodiments, when a backend service provides actionable notification messages, it can designate the inbox (or inboxes) that need to be notified, depending on the situation. For example, in an emergency, the backend service may direct an actionable notification message to the inbox for all of the IT administrators. In general, the IT administrator may define the rules governing the partitioning of messages received from one or more backend services into multiple inboxes that were created on behalf of the customer organization. Using this approach, the inboxes and rules may have to be set up before a backend service can send an actionable notification message. Therefore, it may be possible that a critical message from a backend service may not be handled correctly prior to the creation and configuration of the inboxes.

In other embodiments, the notification service itself may be configured to automatically one or more inboxes for a customer's service provider account directly. For example, the notification service may create a default inbox and/or an "emergency contact" inbox for the customer organization whether or not an IT administrator also creates inboxes for the customer organization. Using this approach, a backend service may have a place for any actionable notification messages it creates to be stored by the notification service (and subsequently retrieved from) regardless of when (or whether) more specific inboxes are created on the customer organization's behalf.

Note that, in some embodiments, a backend service that submits an actionable notification message to an inbox to be managed by the notification service may not know (or have any need to know) which of multiple authorized recipients actually retrieved the actionable notification message or when. However, after an authorized recipient selects an action included in the actionable notification message, the backend service may be able to determine that the action was performed, and may update the state of the actionable notification message accordingly.

In some embodiments, an IT administrator in a service provider customer organization may define inboxes for the customer organization and may also set up (for each backend service from which actionable notification messages will be submitted to the notification service) rules about which actionable notification messages should be stored in which of the customer organization's inboxes. In some embodiments, the IT administrator may associate a message topic with an inbox. In such embodiments, if a customer or member of the customer organization is a subscriber to that message topic, they may receive an alert when an actionable notification message associated with that message topic is stored by the notification service and/or when any actionable notification message is stored in the inbox associated with that message topic.

Note that the notification service and/or the backend services that are clients/customers of the notification service may make a distinction between the users who have permissions to access an inbox (e.g., to view the messages in an inbox) and the users who have permissions to initiate the performance of one of the actions included in a particular actionable notification message that is stored in an inbox that they are authorized to view. Note also that, in some embodiments, an IT administrator may be able to grant permissions to one or more other members of the customer organization (e.g., another IT administrator or an end user) to perform actions that might otherwise be limited to the IT administrator (e.g., modifying or deleting an inbox, or taking an action on an actionable notification message that is directed to multiple IT administrator or other privileged users).

In various embodiments, the notification services (or inbox services) described herein may, among other things, have the ability to create messages (e.g., actionable notification messages), assign them to an inbox, and, if a message topic is specified during creation of the messages, push the messages to the message topic; delete messages; access the list of all non-deleted messages for a specified inbox; and/or create, read, update, and delete an inbox, and/or associate it with a message topic. In some embodiments, each of the actionable notification messages that are handled by the notification services described herein may include any or all of the following message elements:
  a creation date
  a unique resource identifier for the recipient inbox
  the subject of the message (e.g., a string)
  the content of the message (e.g., a string)
  a message type (e.g., a field that describes one of a pre-determined list of message templates that will be used for rendering the message in various user interfaces, e.g. "PlaintextMessage" or "LinkToConsole")
  a unique message identifier
  a source ID (e.g., an identifier of the backend service that created the message, e.g., "desktop application fulfillment platform", "resource stack management service", "approval service", etc.)
  an indication of the message state (e.g., a string having one of multiple pre-determined values, including "active" and "inactive", among others). Note that upon creation, the state of a message is "active".
  a client token (e.g., an idempotency token)
  an externally unique identifier. Note that the combination of client token plus external ID may allow a caller to know if their call completed successfully or not.

In various embodiments, each inbox may include (or be associated with, through its definition) any or all of the following:
  an inbox name (e.g., a string that is unique for a given service provider customer or end user in a given region)
  a unique resource identifier for the inbox
  a namespace (e.g., a identifier of the service provider customer account that owns and can view the inbox)
  an access policy (e.g., an IAM policy that determines who can view the inbox). Note that, in some embodiments, if no policy is specified, the inbox and all messages sent to it may be viewable for all users (IAM and root users) in the namespace of the inbox.
  a message topic (if the customer elects to employ this optional feature). Note that if the customer opts-in (and creates the message topic) they may also need to create a role and give the notification service access to that message topic via that role.

In some embodiments, the notification service may have the ability to track which messages have been read by the recipient. The notification service may also have the ability to create inboxes that are shared between more than one service provider account (e.g., between multiple service provider accounts for a large customer organization or between service provider accounts of organizations that have partnership or contractual relationships).

In various embodiments, the actionable notification messages created by a backend service and maintained in various inboxes by the notification service may include messages of any or all of the following types: a request for approval to take an action, a request to access a resource, a request to access a service, an indication of the availability of a new resource or resource version, a response to a request submitted on behalf of the customer, a push notification for a resource or service, or a sunset notification for a resource or service. In some embodiments, the actionable notification messages may include an expiration date and (if an expiration date is specified) an expiration action. In such embodiments, if an actionable notification message reaches its expiration date, the notification service may be configured to delete the actionable notification message and/or to take another specified action. Note that end users may not be able to view deleted actionable notification messages. However, in some embodiments, IT administrators (e.g., an IT administrator that has set the state of an actionable notification message to "deleted") may still be able to view such "deleted" messages.

As previously noted, the notification services described herein may support the use of various application programming interfaces by IT administrators. For example, a notification service may support any or all of the following APIs for the use of IT administrators:
  CreateInbox—This API may take as inputs an inbox name, and a unique resource identifier for message topic to be associated with the inbox (if any), and may generate a unique resource identifier for the inbox and create an inbox using the specified inputs. In some embodiments, the inbox name must be unique for the customer account in the region.

UpdateInbox—This API may take as input an inbox name, and may replaces the specified (previously-created) inbox with a new one, as specified by the input.

DeleteInbox—This API may take as an input an inbox name, and may delete the specified inbox for the calling user.

ListInboxes—This API may (implicitly) take the identifier of the calling user as an input, and may return, for all inboxes created by that user, the name, the unique resource identifier for the inbox, and a unique resource identifier for the message topic(s) associated with the inbox (if any).

DescribeInbox—This API may take as inputs the unique resource identifier of an inbox and a description of the inbox (e.g., a string) and may apply (or associate) the description to/with the inbox.

In various embodiments, the notification services described herein may support any or all of the following APIs related to actionable notification messages:

CreateMessage—This non-public API may be used by a backend service to create an actionable notification message. It may take as inputs a customer inbox name, a customer namespace, a subject, content (which may include one or more actionable elements), and/or other optional elements. In some embodiments, if the specified inbox does not exist for the customer, it may be created by the notification service.

DeleteMessage—This non-public API may be used by a backend service to delete a specified message. It may take as inputs an identifier of the message (e.g., a unique resource identifier for the message) and a customer namespace, and may delete the specified message from the inbox.

ListMessages—This API may take as input an identifier of an inbox (e.g., a unique resource identifier for the inbox), and may return, for each message in the inbox, its subject, a unique resource identifier for the message, its creation date, an identifier of its source, and its state. Note that this API may validate that the caller is allowed to access the specified inbox before returning the requested information.

DescribeMessage—This API may take as input a unique resource identifier of a message and may return the specified message. Note that this API may validate that the caller is allowed to access the specified message before returning the requested information.

SetMessageActiveStatus—This non-public API may be used by a backend service. It may take as inputs an identifier of the message (e.g., a unique resource identifier for the message), a state, and a customer namespace, and may set the state of the message to the specified state.

In various embodiments, the inboxes and actionable notification messages described herein may be stored by the notification service on service provider storage resources (e.g., in database tables or in one or more object-based or file-based storage systems, some of which may be key-value storage systems). In one example, for each inbox, the primary key may include a namespace (or a hash of the namespace) and an inbox name within that namespace. Other attributes of each inbox that may be stored in association with the inbox may include an identifier of the inbox (e.g., a unique resource identifier), an identifier of a message topic that is associated with the inbox, and an IAM policy. In one example, for each message in each of the inboxes, the primary key may include an identifier of the message (e.g., a unique resource identifier for the message, or a hash of at least a portion of the unique resource identifier for the message). Other attributes of each message that may be stored in association with the message may include the subject, a unique resource identifier for the inbox in which it is stored, its creation date, its content, its state, a message identifier, a source identifier and/or other optional message elements.

Note that, in various embodiments, an IT administrator may create multiple inboxes for a customer organization (for any reason), and may authorize different members of the customer organization to retrieve actionable notification messages from them. For example, the IT administrator may create more than one inbox into which different actionable notification messages received from a single backend service may be stored, or may create a single inbox into which actionable notification messages received from multiple backend services may be aggregated. In various embodiments, the actionable notification message may be partitioned into different inboxes by source, message type, targeted (authorized) recipients, user roles/permissions or an associated message topic.

Note that in some embodiments, the information provided by the IT administrator indicating the backend services sources and/or message types associated with this inbox may be for information purposed only, and may not have any functional effect on the operation of the inbox or the partitioning of actionable notification messages between the inboxes of a customer organization. Instead, the backend services themselves may be responsible for directing actionable notification messages to particular ones of the inboxes that were created on behalf of a customer organization, according to configuration information provided by the IT administrator when contracting for those services. In other embodiments, the information provided by the IT administrator indicating the backend services sources and/or message types associated with this inbox may be used to configure the backend services so that they direct actionable notification messages to particular inboxes in accordance with this information.

As previously noted, in some embodiments, a backend service that creates an actionable notification message may be responsible for managing the lifecycle of the message. For example, the notification service itself may not have any knowledge of the semantics of the operations of the backend services or of the actions that may be included in the actionable notifications messages they create. Therefore, it may be up to the backend services themselves to determine when, and if, the actions included in those messages have been taken and to respond accordingly (which may include updating the state of the messages). In one example, an enterprise catalog service may create an actionable notification message related to the sharing of a portfolio of software products that includes an action "share portfolio." The notification service may not know (or have any need to know) anything about this action (e.g., what it does, how it is performed, or why it would or would not be selected by a message recipient). However, if this action is selected by a message recipient, the enterprise catalog service may be able to determine that this action has been performed and may respond to this determination in a manner that is in keeping with the operations of the enterprise catalog service in the context created by its performance.

Note that, in some embodiments, a backend service that determines, for an actionable notification message that it created, that one of the available actions included in the message was selected and performed may change the state of the actionable notification message to "inactive" or "delete", after which it may be ignored by other authorized message recipients and/or deleted from the inbox in which it was stored. In other words, once a message recipient has responded to the actionable notification message by taking action, the message itself may not have any additional purpose. However, it may be up to the backend service to decide how to respond in this situation. For example, in some embodiments, the backend service may be configured to respond to this situation in a manner that results in all of the actionable notification messages it has created, regardless of their states, being maintained indefinitely by the notification service as a record of the interactions between the backend service and the consumers of the backend service, or for another purpose. In another example, a customer organization may prefer that all of the actionable notification messages that were created, on behalf of the customer organization, regardless of their states, be maintained by the notification service indefinitely or for a predetermined length of time. In this example, the customer organization may be willing to pay a premium to be able to maintain the actionable notification messages in the notification service and/or to archive actionable notification messages once they become inactive or irrelevant. In some embodiments, a backend service may determine that, based on a change in conditions since a particular actionable notification service was created, that the actionable notification service is no longer relevant (e.g., that there is no need for any message recipient to view the message or take any of the actions presented therein and/or that doing so would be inconsistent with the current conditions). In some such embodiments, the backend service may be configured to change the state of the actionable notification message to "inactive" or "delete", after which it may be ignored by other authorized message recipients and/or deleted from the inbox in which it was stored.

As described herein, by offering a notification service such as those described herein, a service provider may allow customers of one of more their backend services to define actionable notification messages for the backend services they receive, and to set up any number of inboxes into which the actionable notification messages can be stored and from which they can be retrieved by authorized recipients. For example, if a service provider customer (or customer organization) is a customer of an enterprise service catalog, the customer (or an IT administrator of the customer organization) could set up notifications for that service. Similarly, if the service provider customer (or customer organization) is a customer of a desktop application fulfillment platform and/or a resource stack management service, the customer (or an IT administrator of the customer organization) could set up notifications for those services.

Note that while several examples included herein describe these types of services, in other embodiments, any backend services that are configured to take advantage of the notification services described herein may (e.g., though the use of various APIs) interoperate with such a notification service on behalf of their customers. For example, a data storage service, a database service, or a service that provides access to virtualized computing resources may be configured to interoperate with the notification services described herein (e.g., using the APIs defined by the notification service for the backend service and/or for any client-side end user portion of the backend service, if one exists) in order to manage approval requests using the techniques described herein. Note also that, in some embodiments a service that is provided by an entity other than the service provider that provides the notification service (e.g., a service provided to a customer organization through a partnership or contractual relationship with the customer organization) may create and submit actionable notification messages to the notification service and/or retrieve actionable notification messages from inboxes maintained by the notification service (at least some of which may include approval requests).

In some embodiments, the systems and methods described herein may be used to handle "soft failures" that are encountered by service customers. For example, in a system that employs the actionable notification messages described herein, if an end user attempts to perform on operation that the end user does not have permission to perform (e.g., to access a service or other resource that the end user is not authorized to access), rather than just returning a denial of the request, an actionable notification message may be returned to the end user that presents multiple available actions the end user can take. In this example, those actions may include requesting permission to perform the operation, retrying the operation, or cancelling the request. If the end user elects to request permission to perform the action, this may trigger the initiation of an approval workflow. Subsequently, an approver (e.g., an IT administrator or manager) may create another actionable notification message indicating to the end user whether the request was approved and offering one or more actions to take next. Note that in some embodiments, an IT administrator or end user may periodically poll an inbox that they have permission to view to see whether any actionable notification messages have been posted and, if so, to retrieve them and (potentially) to select an action included in the messages. In other embodiments, an IT administrator or end user may receive alerts when an actionable notification message is placed in an inbox that they are authorized to access (e.g., through an end user console of a backend service that they consume, such as the backend service that originated the message) or through an external messaging service (e.g., an email or text messaging service).

Figure 11A:
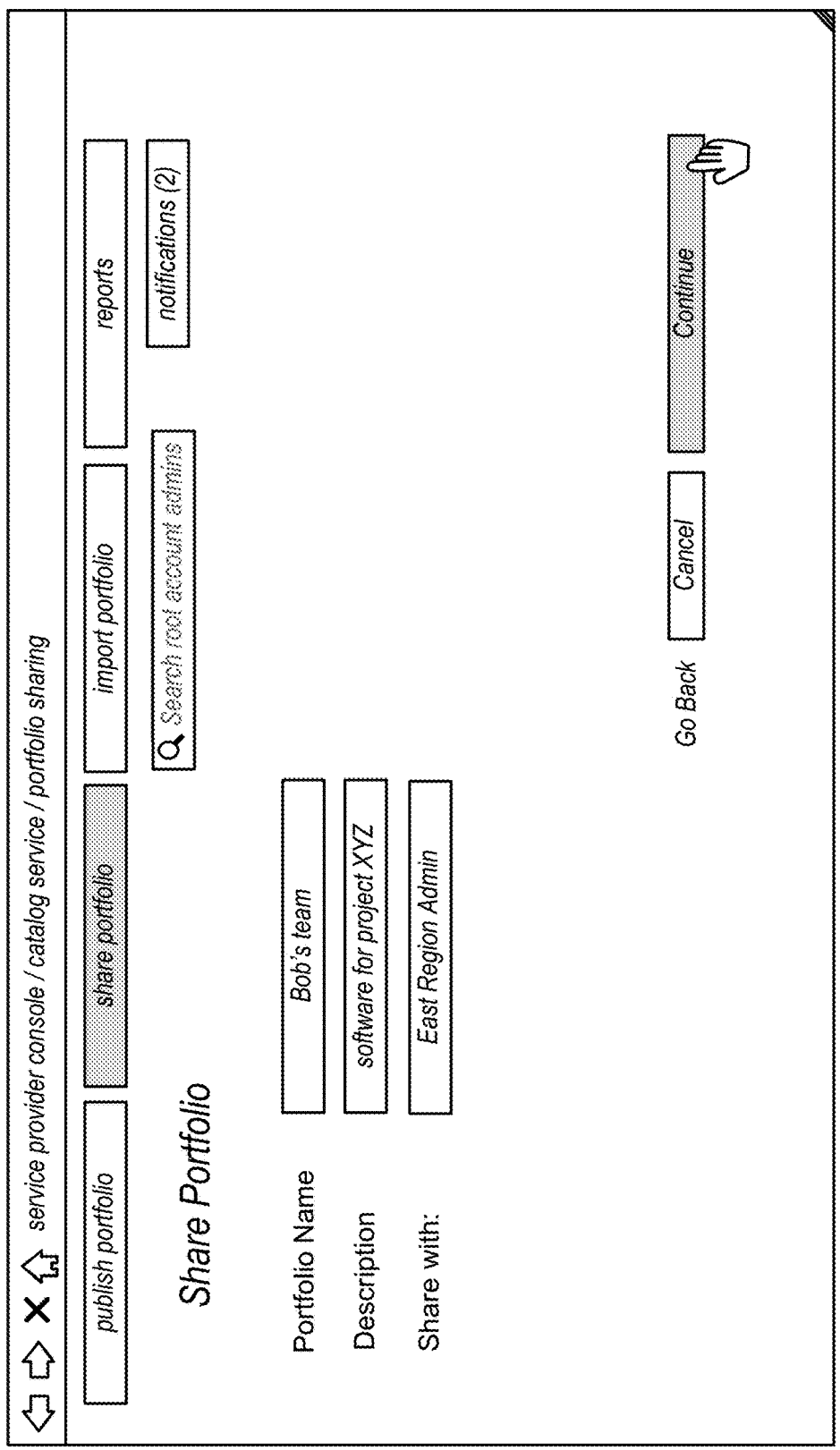
FIG. 11A illustrates an example of the information presented to an IT administrator through a graphical user interface of a service provider management console when initiating a portfolio sharing operation, according to at least some embodiments.

In some embodiments, a notification service such as that described herein may be used to manage approval requests that are associated with various approval templates and/or approval groups. In such embodiments, various actions taken by IT administrators and/or end users within a customer organization (e.g., within administrator or end user consoles of various services received by the customer organization) may trigger the creation and communication of actionable notification messages that represent or include approval requests (e.g., approval requests that are associated with an approval template and one or more approval groups, such as those described herein). For example, when an IT administrator or end user submits a request to view, install, update, or launch a product, to import a portfolio, or to share a portfolio with other administrators or users, this may initiate the performance of an approval workflow that includes the creation of an actionable notification message for a corresponding approval request. In one example, FIG. 11A illustrates an example of the information presented to an IT administrator through a graphical user interface of a service provider management console when initiating a portfolio sharing operation of an enterprise catalog service platform, according to at least some embodiments. In this example, FIG. 11A illustrates information presented by a GUI 1100 on behalf of the enterprise catalog service after the IT administrator or buyer identified as "Central IT Admin" (as the owner of the portfolio "Bob's team"), has selected a portfolio sharing operation. More specifically, the IT administrator or buyer has selected an option to share the portfolio identified as "Bob's team" with another IT administrator in the same customer organization. In this example, the IT administrator has chosen the portfolio to be shared ("Bob's team") and the recipient (identified as "East Region Admin") using text box elements or pull-down menu options.

In some embodiments, once the IT administrator has entered this information and selecting "Continue" at the bottom of the display, a unique resource identifier (e.g., the "portfolio key") for the selected portfolio may be sent to the name recipient (e.g., a notification to that effect may be sent to the recipient by the enterprise catalog service), or the portfolio may be published to a catalog that is discoverable by the recipient. Other options for portfolio sharing that may be selected from the display shown in FIG. 11A include a general "publish portfolio" option (which may make the name of the portfolio and/or its contents discoverable by entitled users and user groups following its creation or configuration), or an "import portfolio" option, which may be used to import a portfolio whose unique resource identifier (portfolio key) was shared with the IT administrator by another portfolio owner. After making the indicated selections, the IT administrator may select an option to "Continue", which may initiate an approval process for the selected sharing operation. For example, selecting "Continue" may trigger the creation of and communication (to an approval service) of an actionable notification message that represents or includes an approval request for the selected portfolio sharing operation (e.g., an approval request that is associated with an approval template and one or more approval groups, such as those described herein). Once the request has been acted upon by members of the approval groups, another actionable notification message may be created and communicated back to the IT administrator, indicating the result of the request.

Figure 11B:
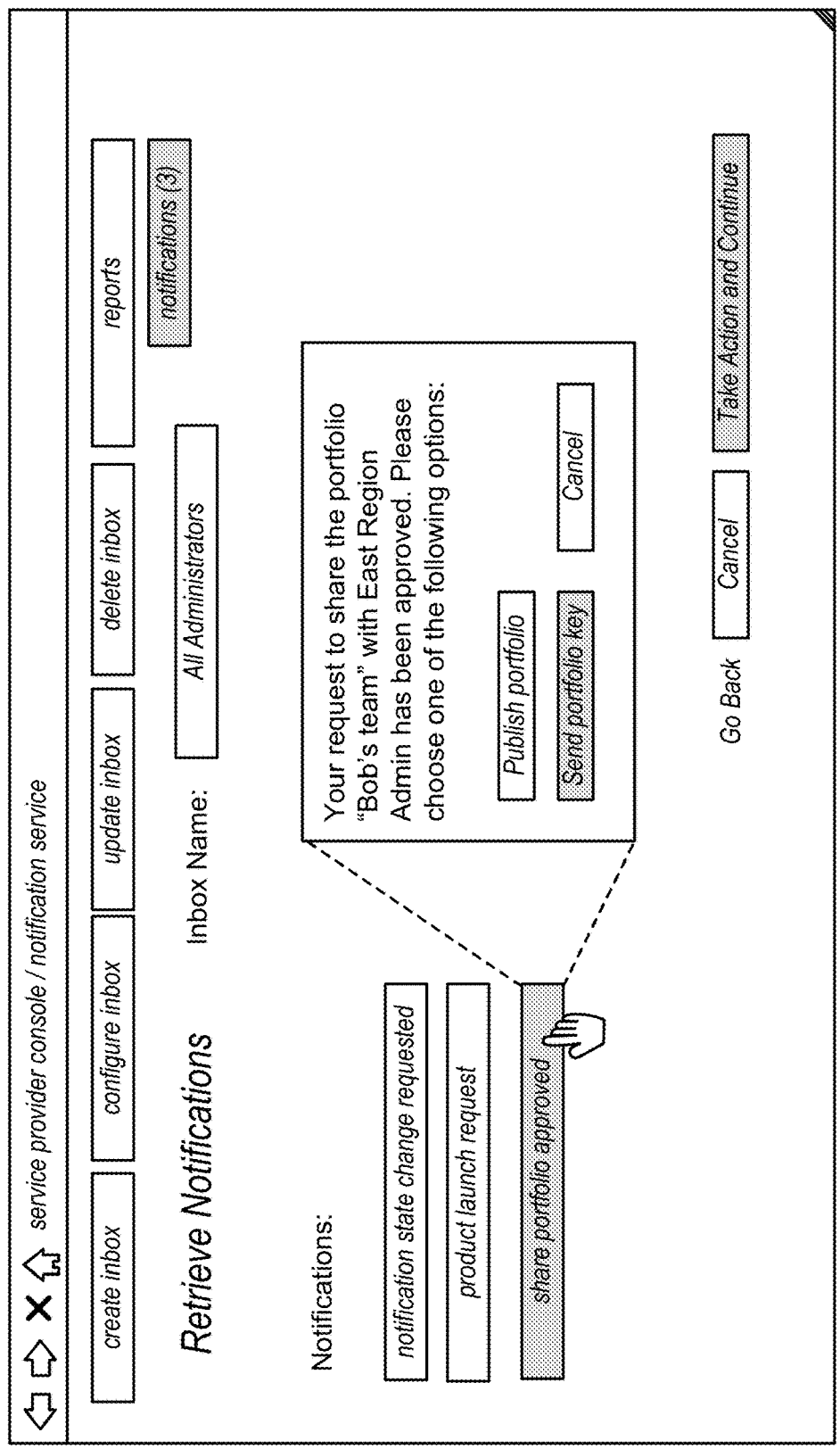
FIG. 11B illustrates an example of the information presented to the IT administrator through a graphical user interface of a service provider management console when viewing actionable notification messages (some of which may represent or include approval requests) in an inbox to be managed by a notification service, according to at least some embodiments.

FIG. 11B illustrates an example of the information presented to the IT administrator through a graphical user interface 1150 of a service provider management console when viewing actionable notification messages (some of which may represent or include approval requests) in an inbox to be managed by a notification service, according to at least some embodiments. For example, the members of the organization that are authorized to view (and, in some cases, act on) the messages in the inbox may constitute an approval group for those messages (including any approval requests represented or included therein). Note that the information presented to an IT administrator in GUI 1150 (e.g., when the IT administrator logs into the notification service through a service provider management console such as that illustrated in FIG. 10) may include different information and options than those presented to an end user who accesses the notification service (or various inboxes thereof). As illustrated in this example, in response to the IT administrator selecting the "notifications" tab near the top right corner of the display, a list of three actionable notification messages (some of which may represent or include approval requests) that have been posted to the inbox "All Administrators" is displayed. The actionable notification messages include a message indicating that a notification state change is requested, a message that includes an approval request for a product launch (e.g., such as the product launch request shown in FIG. 5C), and a notification indicating that a request to perform a portfolio sharing operation (e.g., the operation to share the portfolio "Bob's team" with a recipient "East Region Admin" that was initiated by the IT administrator's selections illustrated in FIG. 11A) has been approved.

In response to the IT administrator selecting the third actionable notification message in this list, a pop-up user interface element is presented that includes more information about the request and actionable links for three options for taking action in response to this notification. In this example, selecting the action "Publish portfolio" may initiate a workflow by which the portfolio "Bob's team" (e.g., the name and/or contents of the portfolio) is made discoverable (e.g., able to be found) by the recipient, selecting the action "Send portfolio key" may initiate the sending of the unique resource identifier for the portfolio "Bob's team" to the recipient, and selecting the action "cancel" may initiate a change of the state of this notification to "inactive". In this example, the IT administrator has chosen the option "send portfolio key" and in response to the IT administrator electing to "Take Action and Continue", shown near the bottom right corner of GUI 1150, this action may be performed and the state of the corresponding actionable notification may be changes to "inactive".

Figure 12A:
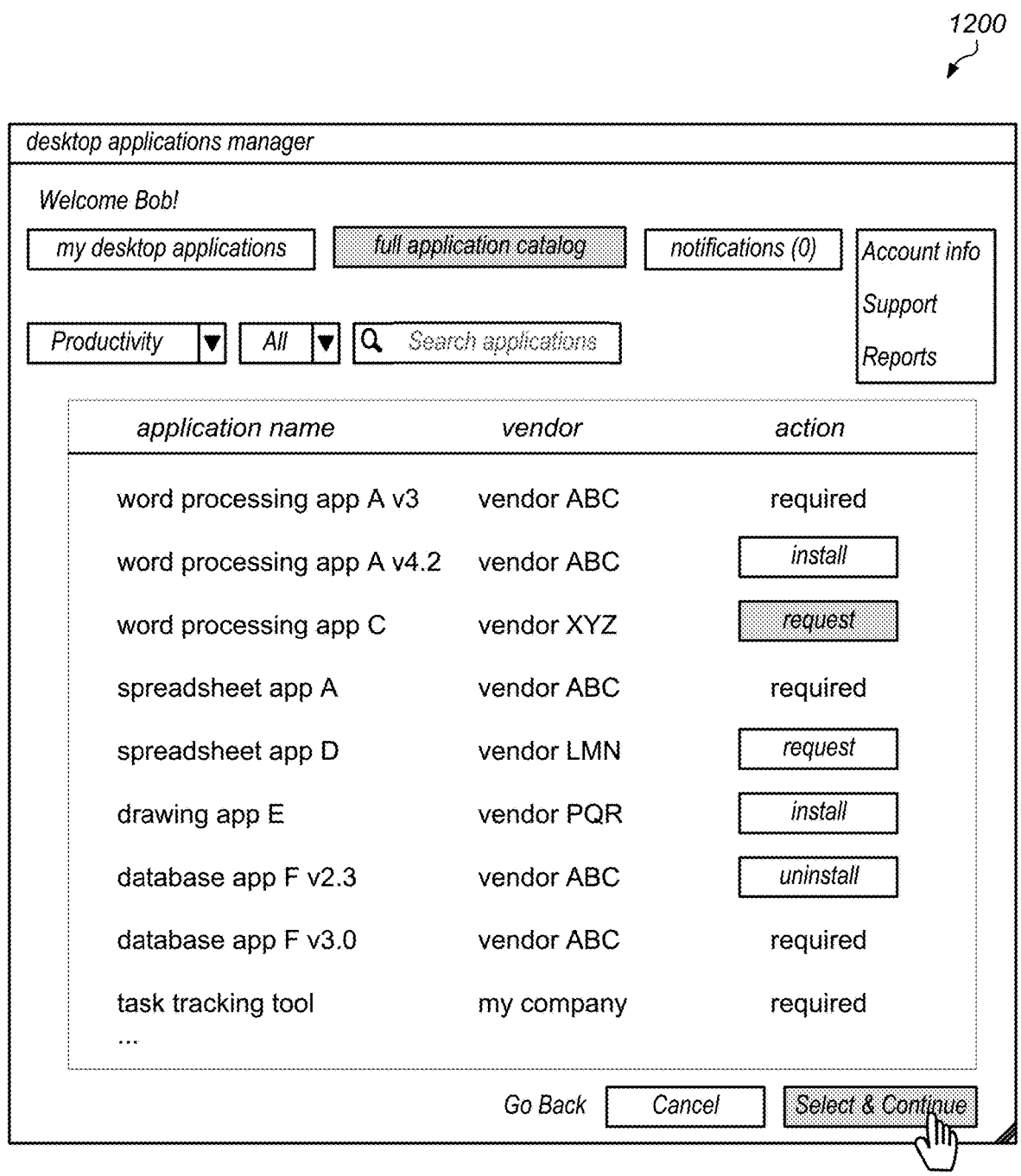
FIGS. 12A-12C illustrate examples of the information presented to an end user or a manager (e.g., an approver) in a customer organization through a graphical user interface of a desktop application management module when the end user elects to request access to a desktop application, according to at least some embodiments.
Figure 12B:
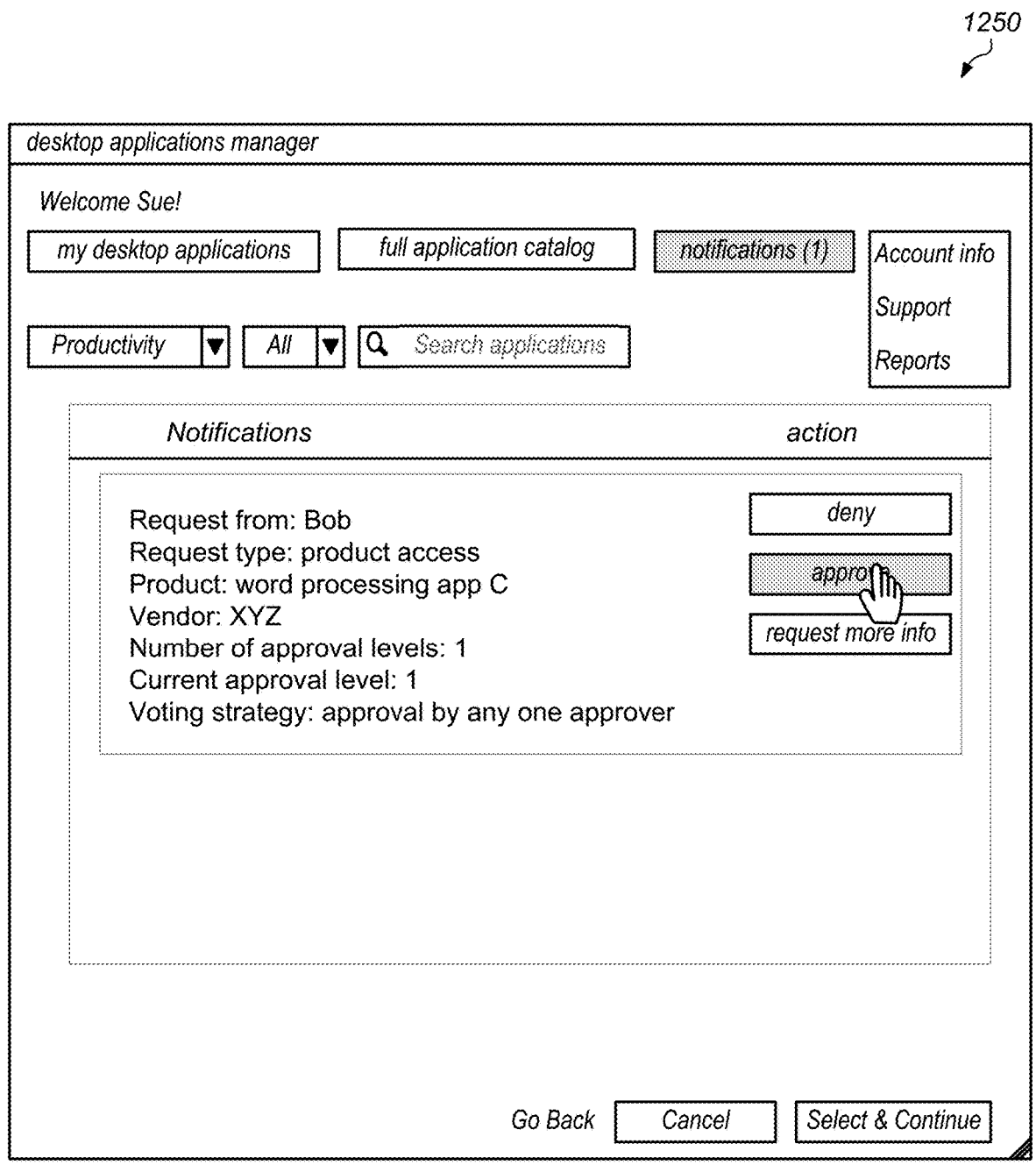
Figure 12C:
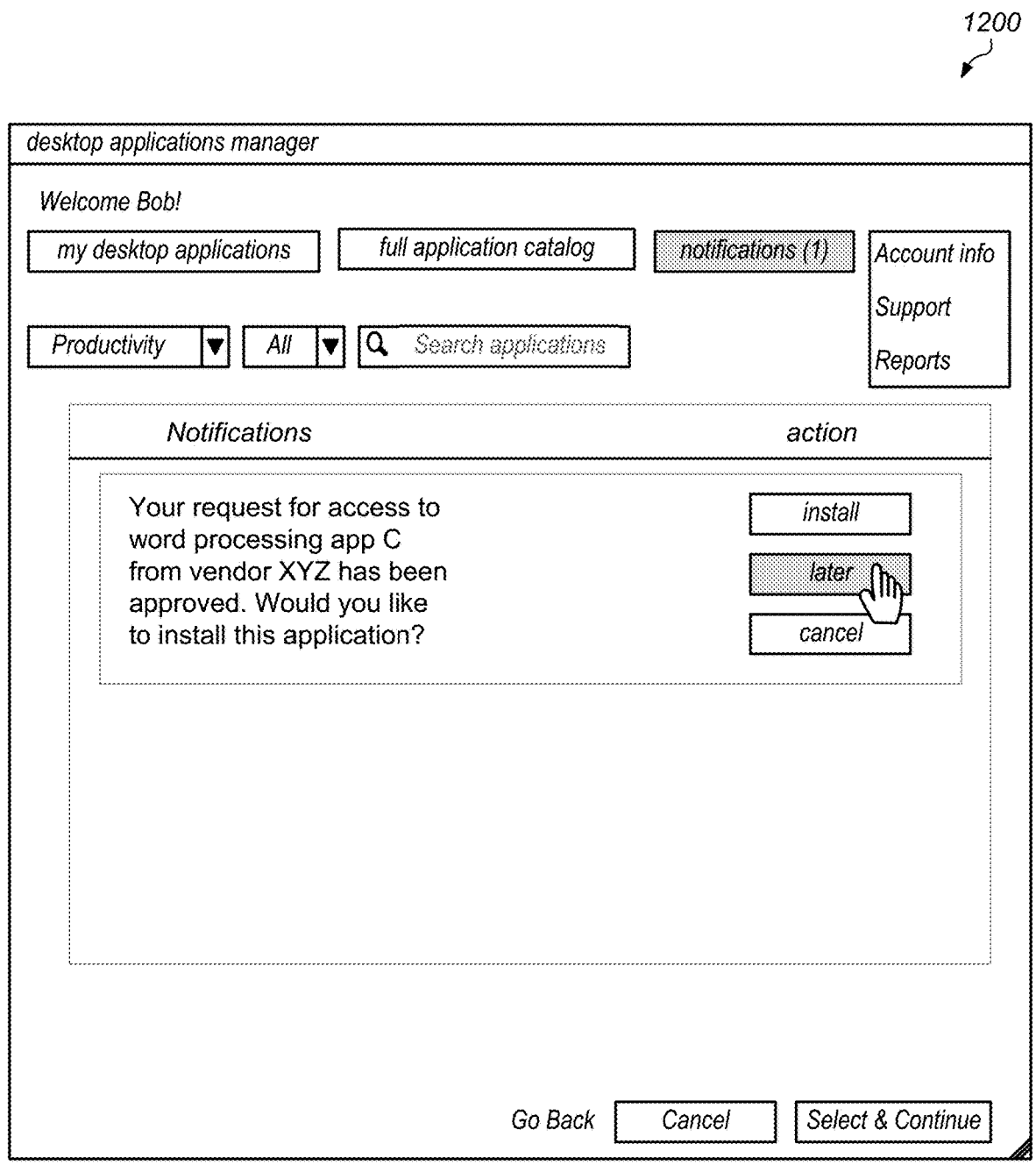

FIGS. 12A-12C illustrate examples of the information presented to an end user or a manager (e.g., an approver) in a customer organization through a graphical user interface of a desktop application management module (such as desktop application management module 1066 in FIG. 10) when the end user elects to request access to a desktop application, according to at least some embodiments. More specifically, FIG. 12A is a block diagram illustrating one embodiment of a graphical user interface (GUI) 1200 for a desktop application management module that is installed on an end user's computing resource instance, such as desktop application management module 1066 illustrated in FIG. 10. Through this interface, an end user may view applications that are assigned to the end user or are part of a private catalog or portfolio of applications made available to the end user and/or one or more other end users (e.g., through an enterprise catalog service platform such as enterprise catalog service platform 1006 in FIG. 10) by an IT administrator in the same business, enterprise, or organization ("my desktop applications"). In some embodiments, the list of applications presented by the selection of "my desktop applications" may include the union of the set of applications that have been individually and directly assigned to the end user and any applications included in portfolios with which the end user is associated and for which the end user has been granted access permissions (e.g., a logical private catalog for the end user).

In the example illustrated in FIG. 12A, the end user has chosen to view information about a "full application catalog". This catalog may include customer-specific line-of-business applications (e.g., applications developed or published by the customer organization itself), applications developed and/or published by the service provider, and/or applications developed and/or published by someone other than the end user's company or the service provider. In addition, the full application catalog displayed in FIG. 12A may include customer-specific line-of-business applications, applications developed and/or published by the service provider and/or third party applications that have not been assigned to the end user or that are included in a catalog that is made available to the end user by their IT administrator (including some for which the business, enterprise, or organization does not yet have a subscription or license) instead of, or in addition to, applications that are included in a catalog or portfolio of applications that have been made available to the end user and/or one or more other end users by an IT administrator (whether or not the applications are assigned to the end user). For example, the list of applications presented in graphical user interface 1200 illustrated in FIG. 12A includes a word processing application (word processing app C) and a spreadsheet application (spreadsheet app D) that are not currently assigned to the end user or included in the end user's private catalog that is presented in FIG. 12A. In this case, the end user has selected a "request" action in order to request access to (e.g., a subscription to) one of these applications (specifically, word processing app C). If the application has not yet been licensed by the service provider or the end user's company, selecting this action may, if the request is subsequently approved (e.g., through an approval service such as those described herein), initiate the acquisition and/or licensing of the application by the service provider or the end user's company and the ingestion of the application into the application fulfillment platform. Note that, in some embodiments, an application may be marked as having an installation type of "request access" for one or more end users, meaning that the application is discoverable by those end users, but cannot be installed or launched by those end users until or unless a request to access the application is approved (e.g., by the IT administrator).

In some embodiments, there may be a notification engine within the desktop application management module that is configured to inform end users of upcoming application updates and newly available features. The notification engine may be accessed through the desktop application management module graphical user interface, or using other mechanisms, in different embodiments. For example, if the IT administrator has made new optional applications available for end users to subscribe to, they may be notified through the desktop application management module. As illustrated in FIG. 12A, the end user may have the option to view these notifications through the user interface of the desktop applications management module (e.g., using the "notifications" tab shown in FIG. 12A). For example, the end user may receive a notification when a new application is made available to the end user individually, is added to a catalog or portfolio of applications that are assigned or are otherwise available to the end user, or is added to the full application catalog, or when a new generation or version of an application to which the end user is currently subscribed is made available. In such embodiments, a notification alert may be indicated when and if a response to the end user's request to access word processing app C is posted with a notification service (such as notification service 1058 in FIG. 10) or sent to an approval service (such as approval service 258 in FIG. 2 or approval service 1055 in FIG. 10) by the backend service responsible for responding to the request (which, in this example, may be a desktop application fulfillment platform, such as desktop application fulfillment platform 1008 in FIG. 10. For example, an actionable notification message (e.g., one that includes an approval request to access word processing app C) may be posted by the desktop application fulfillment platform to an inbox that the user is authorized to access if and when the request is approved, and this actionable notification message may include links for multiple options for taking action in response to a subsequent approval.

FIG. 12B illustrates a graphical user interface 1250 of the desktop application manager when the end user's manager, Sue, has chosen to view the notifications that have been posted to inboxes that this manager (as a member of an approval group for at least some approval requests) is authorized to access. For example, Sue may be a member of an approval group "Level 1 department managers" that is associated with all approval requests for product access by end users in the organization (including Bob). In this example, there is only one actionable notification message posted for this manager (e.g., only one notification that the manager is authorized to retrieve and/or act upon). In this example, the actionable notification message describes the end user's approval request to access word processing app C and includes three available actions that the manager can take in response. More specifically, the actionable notification message includes one or more of: an identifier of the requestor (in this case, "Bob"), the request type (in this case, "product access"), an identifier of the requested product (in this case, "word processing app C"), the vendor of the requested product (in this case, "XYZ"), the number of approval levels for the request (in this case, one), the current approval level (in this case, level 1), and the applicable voting strategy for this approval level (in this case, "approval by any one approver"). In this example, the three available actions that the manager can take include "deny", "approve", or "request more info". In other embodiments, the available actions may include more, fewer, or different options (e.g., "temporarily deny", "permanently deny", "later", or "abstain").

In this example, selecting the action "deny" may initiate the return of a notification to the end user (through the desktop application fulfillment platform) that the request has been denied. Conversely, selecting the action "approve" may, if this action (along with the actions of other approvers, in some cases) results in the approval of the request, initiate the return of a notification to the end user (through the desktop application fulfillment platform) that the request has been approved. In some embodiments, a third option "request more info" may be selected by the approver. In such embodiments, in response to selection of this action, the approver may be presented with an input mechanism for specifying the information they wish to receive, after which a notification may be sent to the end user (through the desktop application fulfillment platform) requesting that information. As illustrated in FIG. 12B, Sue has elected to approve Bob's request. Therefore, since only one approval is required for this request, once her selection has been made and she elects to "Select & Continue", the approval service may store information reflecting the approval of the request and may initiate the return of a notification (through the desktop application fulfillment platform) to the end user, Bob, indicating that the request has been approved.

FIG. 12C illustrates a graphical user interface 1200 of the desktop application manager when the end user (Bob) has chosen to view the notifications that have been posted to inboxes that the end user is authorized to access. In this example, there is only one actionable notification message posted for this end user (e.g., only one notification that the end user is authorized to retrieve and/or act upon). This actionable notification message indicates that the end user's previous request to access word processing app C has been approved and includes three available actions that the end user can take in response. In this example, selecting the action "install" may initiate a "create fulfillment" workflow on the desktop application fulfillment platform, selecting the action "cancel" may initiate a change of the state of this notification to "inactive", and selecting the action "later" may add the application to an intended state for the end user and/or may initiate a change of state for this notification to "temporarily inactive" or to some other intermediate state. In this example, since the user has selected "later", the next time the end user views this actionable notification message, it may include options to "cancel" the actionable notification message (as before) or to "reactivate" the actionable notification message.

Figure 13A:
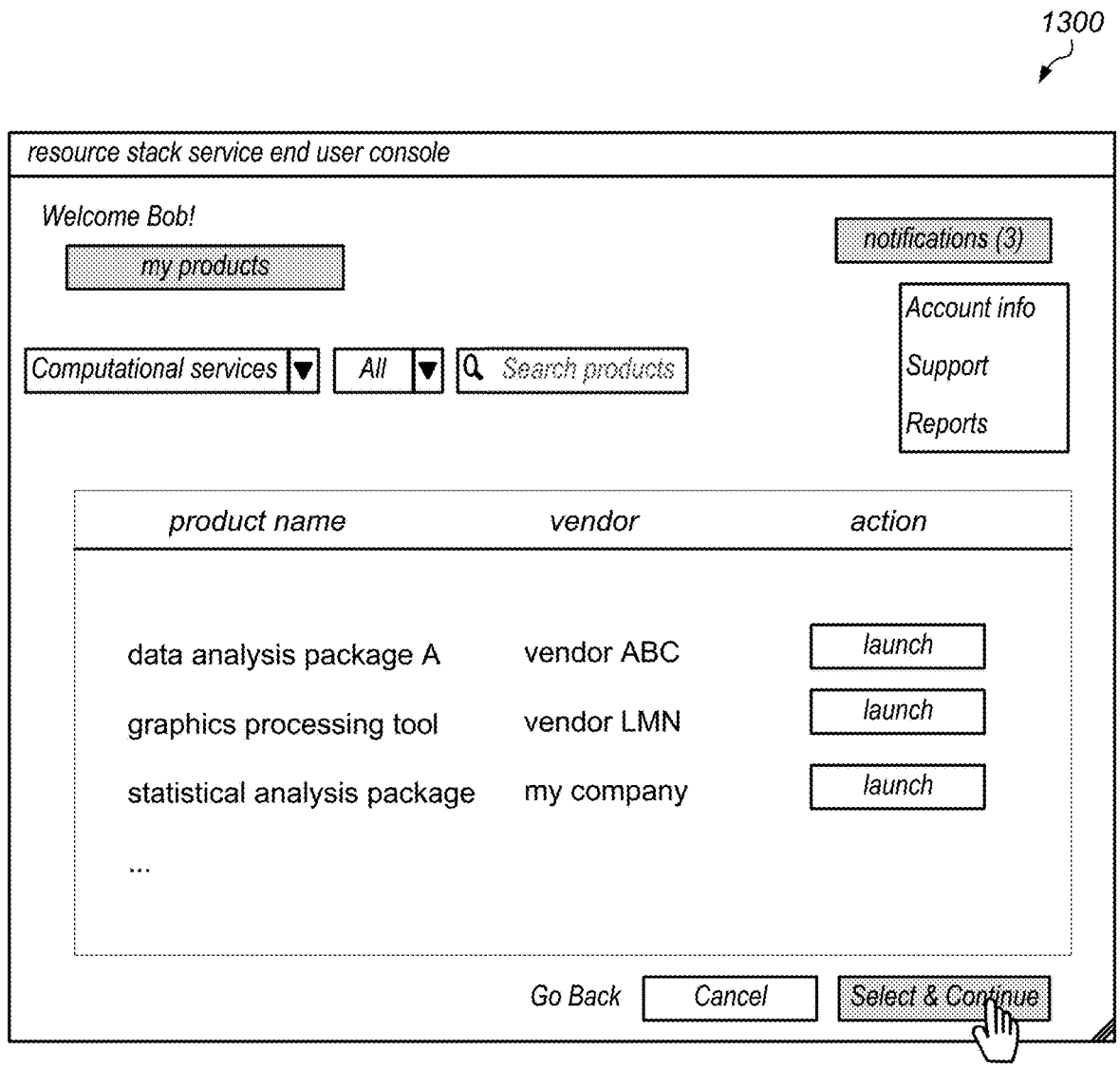
FIGS. 13A and 13B illustrate examples of the information presented to an end user through a graphical user interface of a resource stack management service console, according to at least some embodiments.

FIG. 13A illustrates an example of the information presented to an end user through a graphical user interface (GUI 1300) of a resource stack management service console (such as resource stack management service console 1068 in FIG. 10), according to at least some embodiments. In this example, in response to selection of the "my products" tab near the top of the display, information may be presented to an end user who wishes to search for, select, and launch a service (e.g., a server product) that is managed by an enterprise catalog service (e.g., a service implemented by enterprise catalog service platform 1006 in FIG. 10). More specifically, the end user has chosen to filter their search results by choosing "Computational services" from among multiple product type options (e.g., from a pull-down menu of such options). In this example, GUI 1300 also presents options for the end user to generate and/or view reports (e.g., server product deployment reports), and to view (and, in some cases, take action in response to) notifications.

The information presented in this example includes, in one portion of the display, a list of server products (e.g., server-type applications that execute on a service provider system on behalf of an end user and return a response), each of which may be constructed using a respective resource stack template, along with information identifying the vendors that developed or published the server products (or corresponding resource stack templates) and/or from which they were obtained, and user interface elements that may be selected if the end user would like to launch or update a particular one of the listed server products. In some embodiments, the end user may receive a notification when a new server product is made available to the end user individually or is added to a catalog or portfolio of server products that are assigned or are otherwise available to the end user, or when a new generation or version of a server product to which the end user is currently subscribed is made available. In addition, in some embodiments, a notification alert may be indicated in GUI 1300 when an actionable notification message to that effect or when a response to an approval request made by the end user for access to a new product is posted to an inbox that the end user is authorized to access in a notification service (such as notification service 1058) or is submitted to an approval service (such as approval service 258 or 1055) by the backend service responsible for responding to the approval request (which, in this example, may be the resource stack management service).

Figure 13B:
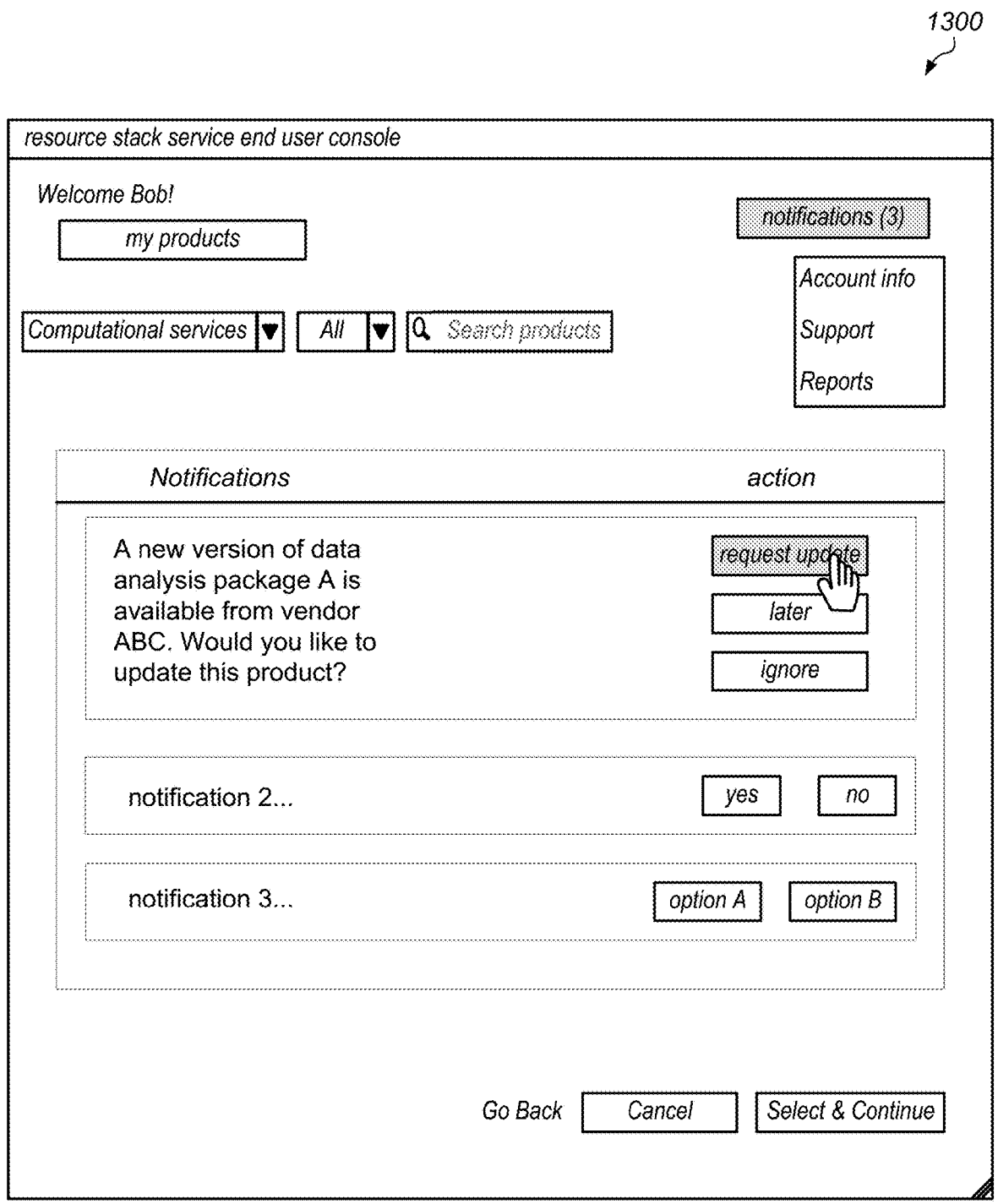

FIG. 13B illustrates graphical user interface 1300 of the resource stack management service console when the end user has chosen to view the notifications that have been posted to inboxes that the end user is authorized to access. In this example, there are three actionable notification messages posted for this end user (e.g., three notifications that the end user is authorized to retrieve and/or act upon), each of which includes actionable links for multiple options for taking action in response to the notification. The first of these actionable notification messages indicates that a new version of a product that the end user is currently subscribed to is available, and this actionable notification message includes multiple options for taking action in response to the approval. More specifically, the end user is presented with actionable options that include "request update" (which, if selected, may initiate an approval workflow and/or a product fulfillment/delivery workflow), "later" (which, if selected, may initiate a change of state for the actionable notification message to a "temporarily inactive" state), and "ignore" (which, if selected, may initiate a change of state for the actionable notification message to "delete").

In this example, the end user has chosen the action "request update". More specifically, in this example, Bob is using data analysis package A while working on project QRS. Therefore, in response to Bob selecting the option "request update", an actionable notification message that represents or includes an approval request to update data analysis package A (one that includes a reference to project QRS) may be sent to an inbox that his manager (Sue) and one or more other approvers in the same approval group have access to (e.g., an inbox that is associated with the topic "project QRS"). One or more members of the approval group may subsequently view the actionable notification message and may respond to the approval request, after which the approval service may determine a result (based on those responses) and return a notification message that includes an indication of the result to the end user (Bob). In addition to initiating various workflows, selection of this response may initiate a change of a state (by the backend service) to "inactive".

Note that, in some embodiments, end users may (through various end user consoles such as consoles 264 or 266 in FIG. 2 or consoles 1064, 1066, or 1068 illustrated in FIG. 10, or through the selection of an action presented in an actionable notification message) be able to subscribe to a message topic (e.g., in order to request and receive push notifications for that topic). In some embodiments, end users (e.g., if authorized to do so by their IT administrators) may also be able to modify the configuration of an inbox, approve certain types of requests that are included in an actionable notification message or participate in an approval chain that is managed using actionable notification messages, or perform other tasks that would otherwise not be available to them.

Figure 14A:
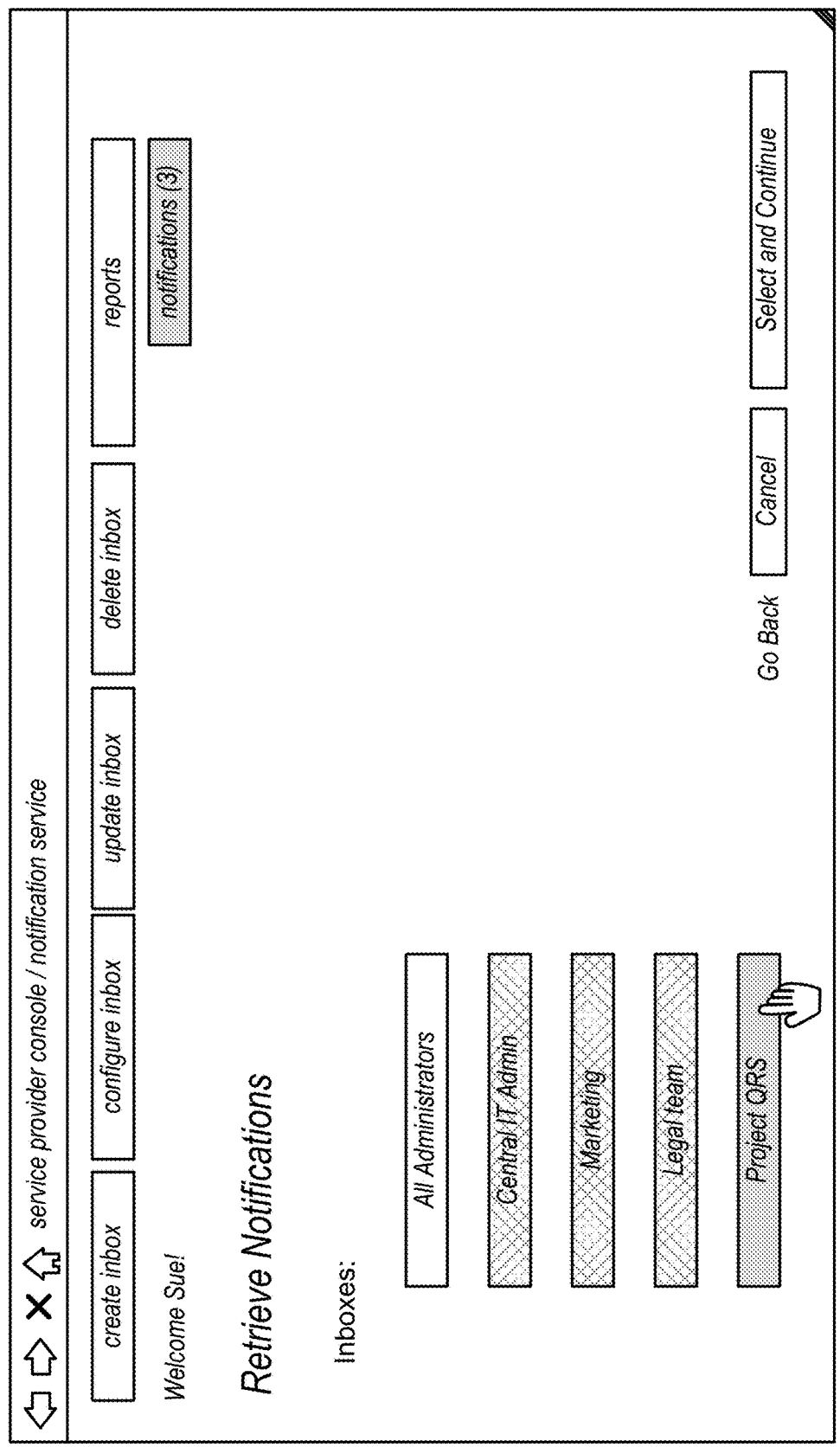
FIGS. 14A and 14B illustrate examples of the information presented to an approver through a graphical user interface of a service provider management console when retrieving and/or acting upon actionable notification messages that were posted to an inbox managed by a notification service, according to at least some embodiments.
Figure 14B:
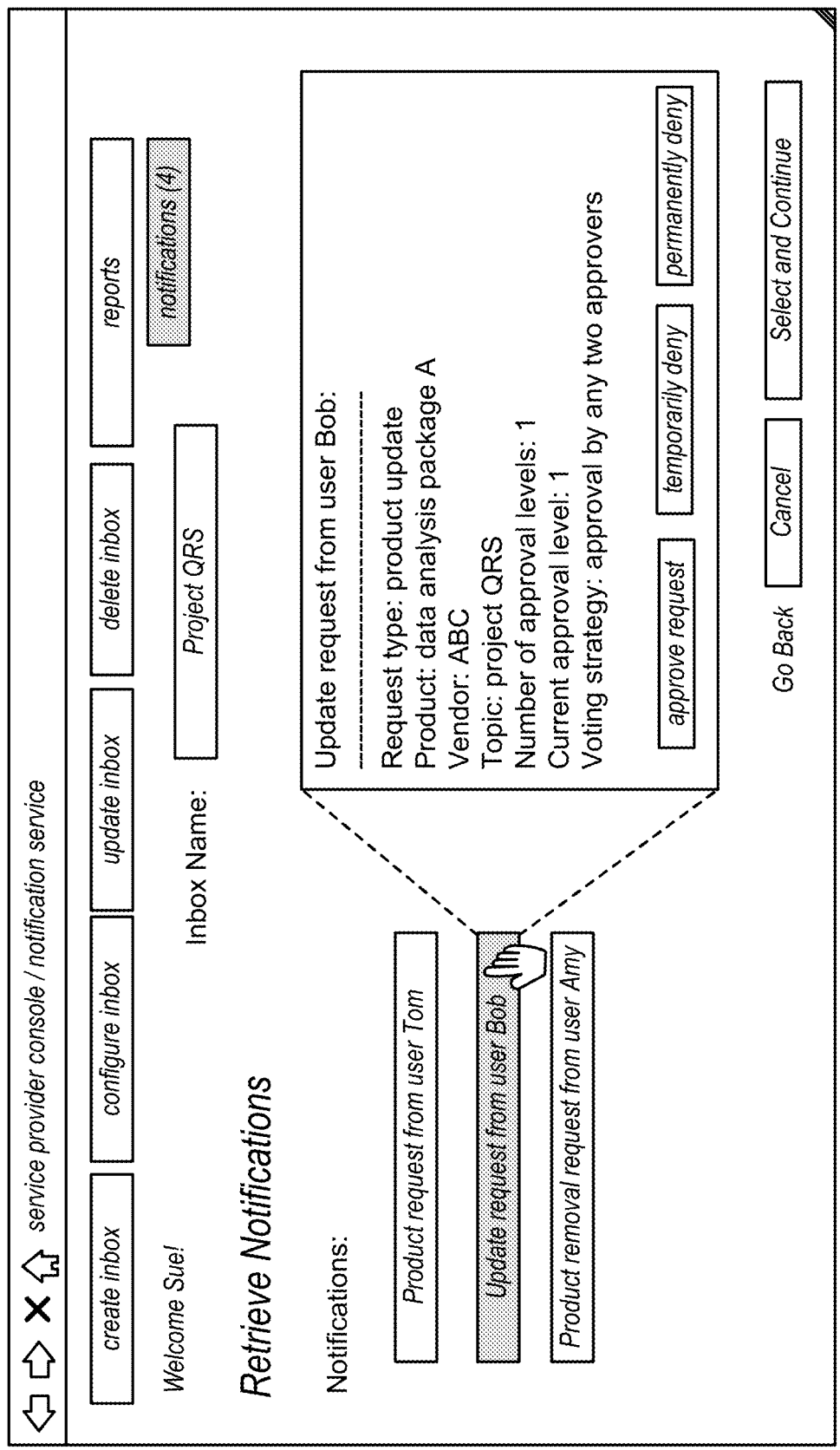

FIGS. 14A and 14B illustrate examples of the information presented to an approver (in this case, Bob's manager, Sue) through a graphical user interface of a service provider management console when retrieving and/or acting upon actionable notification messages that were posted to an inbox managed by a notification service (including, in some cases, those that include approval requests), according to at least some embodiments. More specifically, FIG. 14A illustrates an example of the information presented to an approver through a graphical user interface 1400 of a service provider management console when viewing actionable notification messages in an inbox managed by a notification service. Note that the information presented in GUI 1400 to an approver that is a team leader or manager (e.g., when the team leader or manager logs into the notification service through a service provider management console such as that illustrated in FIG. 10) may include more, less, or different information and/or options than those presented to an IT administrator who accesses the notification service (or various inboxes thereof). As illustrated in this example, in response to the approver selecting the "notifications" tab near the top right corner of the display, the approver may be presented with a list of inboxes that are managed by the notification service on behalf of the customer organization of which the approver is a member (e.g., the current list of inboxes that have been created under the customer organization account, or the output of a ListInboxes API call). In this example, the user interface elements for inboxes "Marketing", "Legal team", and "Central IT Admin" include hash marks and are not selectable by the approver because the approver does not have permission to access those inboxes. In this example, the approver (Sue) is authorized to access inboxes "All Administrators" and "Project QRS", and the user interface elements for these inboxes are selectable.

Here, the approver has selected the inbox "Project QRS". Once the approver elects to "Select and Continue" as shown near the bottom right corner of GUI 1400, the approver will be presented with additional information about the selected inbox (as shown in FIG. 14B).

FIG. 14B illustrates an example of the information presented to the approver through GUI 1400 following the selection of the inbox "Project QRS", as in FIG. 14A. In this example, the approver is presented with the current list of actionable notification messages in this inbox (e.g., the output of a ListMessages API call). In some embodiments, the messages may be sorted by date, with the most recently posted message being displayed first (at the top of the list). In this example, three actionable notification messages are included in the inbox: "Product request from user Tom" (e.g., an approval request for access to a product that Tom is not currently authorized to receive), "Update request from user Bob" (e.g., an approval request to receive a new version of a product, as described in reference to FIG. 13B), and "Product removal request from user Amy" (e.g., an approval request to remove a product from Amy's computing resource instance). In this example, there are no hash marks on any of the messages, indicating that, since the approver is authorized to access this inbox, the approver is also authorized to view and/or take action on any of the messages in the inbox. In this example, approver has selected the message "Update request from user Bob", which has resulted in the presentation of additional information about the selected message.

In this example, the approver is presented with a pop-up user interface element that includes the full content of the selected actionable notification message (e.g., the output of a DescribeMessage API call) and includes actionable links for three options for taking action in response to this notification. Note that these options are included in the message by the service that created and sent the notification, which, in this case, may be an approval service. As illustrated in this example, the pop-up user interface element may display, for the selected approval request, one or more of the following: a request type (in this case, "product update"), the requestor (in this case, Bob), a topic (in this case, "project QRS"), a product (in this case, "ABC"), the number of approval levels for this request (in this case, one), the current approval level (in this case, level 1), and a description of the voting strategy (as defined for the single level approval in an associated approval template).

In this example, the approver is presented with actionable options that include "approve request" (which, if selected, and if another approver also approves the request, may result in notifying end user Bob that his request has been approved, initiating a product fulfilment/delivery workflow, and/or updating the state of this actionable notification message to "inactive"), "temporarily deny" (which, if selected, may initiate a change of state for the actionable notification message to a "temporarily inactive" state, but may not update an intended state for the end user indicating that he cannot ever have access to the requested product version), and "permanently deny" (which, if selected, may initiate a change of state for the actionable notification message to a "delete" state, and may update an intended state for the end user indicating that he cannot ever have access to the requested product version). Once the approver selects one of the available actions and elects to "Select and Continue" as shown near the bottom right corner of GUI 1400, the selected action may be submitted to the approval service. Note that multiple different members of the approval group that is authorized to respond to this approval request (e.g., approval group members other than Sue) may log into the notification service to retrieve approval requests from the inbox "Project QRS" and to respond to the requests included therein (include the update request from user Bob). If and when enough of them have entered their responses to be able to determine a result, the approval service may determine and store the result and return an indication of the result to the end user (Bob). Also note that the members of this approval group may be included in one or more other approval groups and that each approval group may be associated with multiple approval requests (e.g., individually, or by virtue of their association with a particular product, portfolio, project, action, message topic, workflow, or request type).

Note that, in other embodiments, the graphical user interfaces illustrated in FIGS. 3A-3B, 4A-4B, 5A-5C, 11A-11B, 12A-12C, 13A-13B, and 14A-14B may include more, fewer, or different elements that those illustrated and described herein. Note also that the user interface elements included in the graphical user interfaces illustrated in FIGS. 3A-3B, 4A-4B, 5A-5C, 11A-11B, 12A-12C, 13A-13B, and 14A-14B and described herein may, in other embodiments, take different forms (e.g., as menus items, icons, radio buttons, text boxes, check boxes, or other user interface element types) and/or may be arranged in a different order or in different positions within the GUI than the order or positions in which they are arranged in FIGS. FIGS. 3A-3B, 4A-4B, 5A-5C, 11A-11B, 12A-12C, 13A-13B, and 14A-14B.

Example Provider Network Environment

This section describes an example provider network environment in which embodiments of the methods described herein may be implemented. However, this example provider network environment is not intended to be limiting. In various embodiments, in such provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

In some embodiments, desktop applications that are included in catalogs managed by an enterprise catalog service such as those described herein may be delivered to and/or deployed, installed or executed on virtualized computing resources (e.g., virtual computing resource instances implemented on service provider hardware in a cloud computing environment), rather than on physical client computing devices. In addition, server products that are included in catalogs managed by an enterprise catalog service may be implemented as resource stacks (e.g., stacks of service provider resources) that collectively provide a service. These service provider resources may also include virtualized computing resources, such a virtual computing node instances implemented on service provider hardware in a cloud computing environment. In various embodiments, such virtualized computing resources may be employed in implementing the notification services described herein. For example, the notification service and/or any of the backend services that are customers of the notification service may execute on virtualized computing resources in a cloud computing environment for the benefit of various customer organizations and their end users. An example service provider network that provides virtualized computing resources for these and other uses is illustrated in FIG. 15 and described below.

Figure 15:
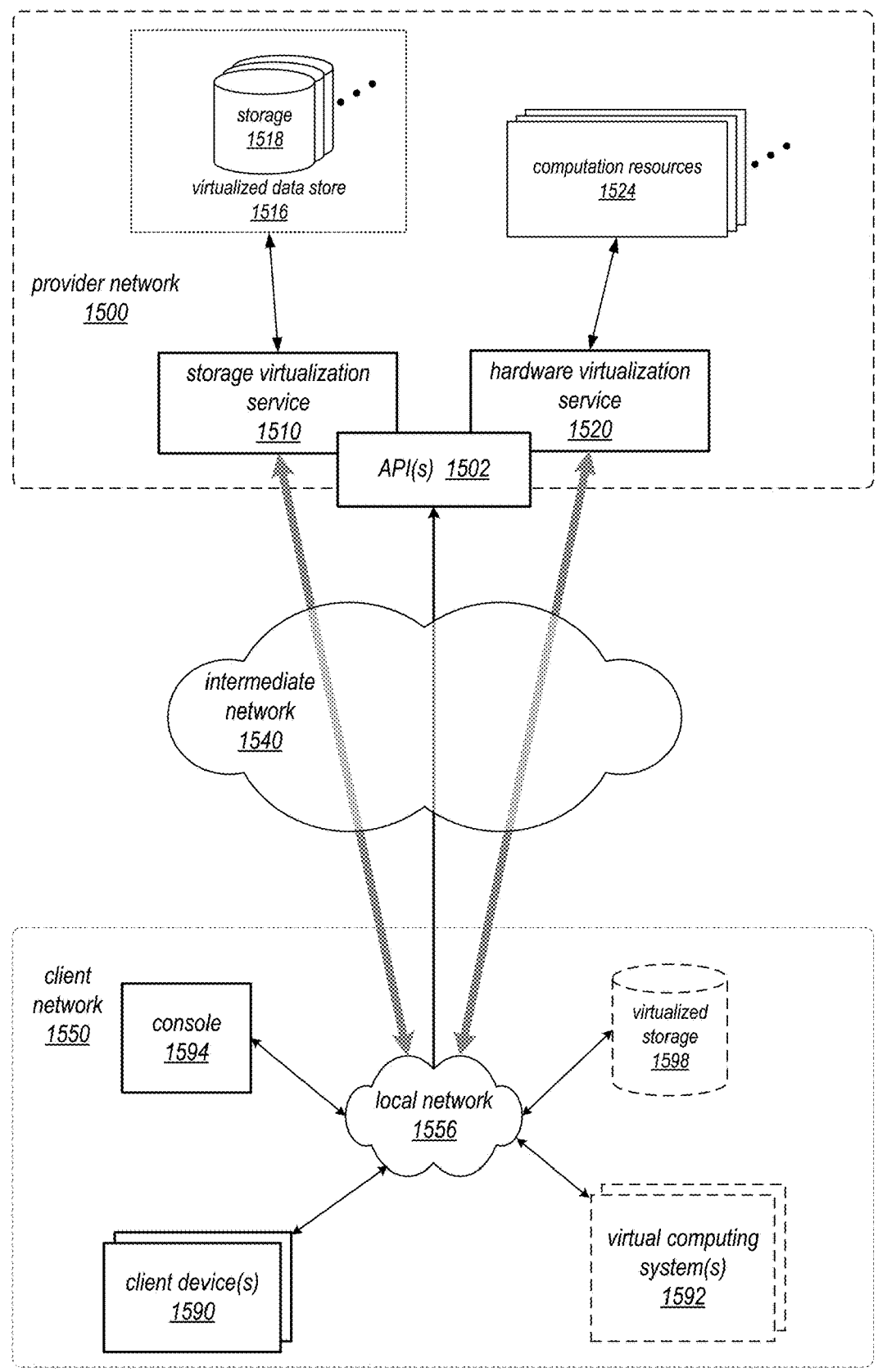
FIG. 15 is a block diagram illustrating an example provider network that provides a storage virtualization service and a hardware virtualization service to clients, according to at least some embodiments.

FIG. 15 is a block diagram of an example provider network environment, one that provides a storage virtualization service and a hardware virtualization service to clients, according to at least some embodiments. In this example, hardware virtualization service 1520 provides multiple computation resources 1524 (e.g., VMs) to clients. The computation resources 1524 may, for example, be rented or leased to clients of the provider network 1500 (e.g., to a client that implements client network 1550). As noted in the previous example, in some embodiments, provider network 1500 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 1500. In this example, each computation resource 1524 may be provided with one or more private IP addresses. Provider network 1500 may be configured to route packets from the private IP addresses of the computation resources 1524 to public Internet destinations, and from public Internet sources to the computation resources 1524.

Provider network 1500 may provide a client network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a client network 1550 may access functionality provided by the hardware virtualization service 1520, for example via a console 1594. In at least some embodiments, at the provider network 1500, each virtual computing system 1592 at client network 1550 may correspond to a computation resource 1524 that is leased, rented, or otherwise provided to client network 1550.

From an instance of a virtual computing system 1592 and/or another client device 1590 or console 1594, the client may access the functionality of storage virtualization service 1510, for example via one or more APIs 1502, to access data from and store data to a virtual data store 1516 provided by the provider network 1500. In some embodiments, a virtualized data store gateway (not shown) may be provided at the client network 1550 that may locally cache at least some data, for example frequently accessed or critical data, and that may communicate with virtualized data store service 1510 via one or more communications channels to upload new or modified data from a local cache so that the primary store of data (virtualized data store 1516) is maintained. In at least some embodiments, a user, via a virtual computing system 1592 and/or on another client device 1590, may mount and access one or more storage volumes 1518 of virtual data store 1516, each of which appears to the user as local virtualized storage 1598.

While not shown in FIG. 15, the virtualization service(s) may also be accessed from resource instances within the provider network 1500 via API(s) 1502. For example, a client, appliance service provider, or other entity may access a virtualization service from within a respective private network on the provider network 1500 via an API 1502 to request allocation of one or more resource instances within the private network or within another private network. Note that in some embodiments, the hardware virtualization service 1520 may be configured to provide computation resources 1524 that have been configured to implement a virtual desktop instance, which may appear to the user as a local desktop (implemented by a virtual computing system 1592). Note also that in some embodiments, the computation resources 1524 that are made available to the client via hardware virtualization service 1520 may include multiple network interfaces. For example, some of them may include one network interface for communicating with various components of client network 1550 and another network interface for communicating with computation resources or other network entities on another network that is external to provider network 1500 (not shown).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients. In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise. In at least some embodiments, an application fulfillment platform of the service provider may be configured to provide on-demand delivery of applications (e.g., as virtualized application packages) to virtual desktop instances, as described herein. Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credential presented by the user upon logging into the virtual desktop instance have been authenticated.

Illustrative System

Figure 16:
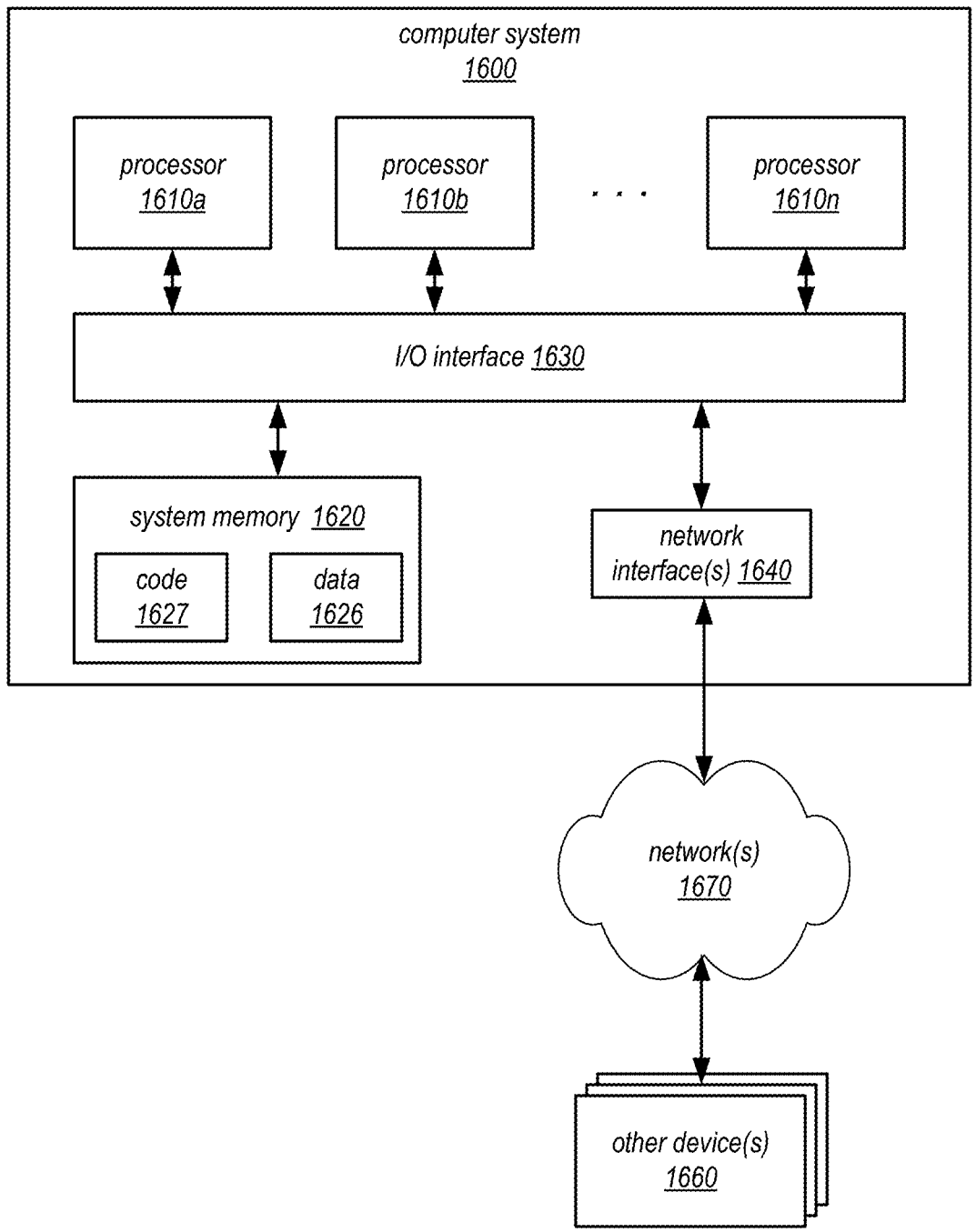
FIG. 16 is a block diagram illustrating an example computer system that implements some or all of the techniques described herein, according to different embodiments.

In at least some embodiments, a server that implements some or all of the techniques for managing requests for approval and/or actionable notification messages (e.g., to receive, store, dispatch, update, and/or otherwise manage requests for approval and/or actionable notification messages that are received from any of a variety of backend services), as described herein, may include a general-purpose computer system that includes or is configured to access a non-transitory computer-accessible (e.g., computer-readable) media, such as computer system 1600 illustrated in FIG. 16. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, virtual desktop instances, catalog services, product fulfillment services and/or any other services to customers or customer organizations; or client computing devices or other components on a client network) may be implemented using a computer system similar to computer system 1600 that has been configured to provide the functionality of those components. In the illustrated embodiment, computer system 1600 includes one or more processors 1610 coupled to a system memory 1620 via an input/output (I/O) interface 1630. Computer system 1600 further includes one or more network interfaces 1640 coupled to I/O interface 1630. In some embodiments, network interfaces 1640 may include two or more network interfaces (including, e.g., one configured for communication between a virtualized computing resource hosted on the computer system 1600 and its clients, and one configured for communication between a virtualized computing resource and external resources, computing systems, data centers, or Internet destinations on networks other than the provider network and a client network on whose behalf the virtualized computing resources are hosted. In other embodiments, network interface(s) 1640 may be a single network interface.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store instructions and data accessible by processor(s) 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for managing requests for approval and/or actionable notification messages, are shown stored within system memory 1620 as code 1625 and data 1626. For example, data 1626 may include information representing approval requests, approval groups, approval templates, associations between approval groups and/or approval templates and approval requests (e.g., individually or by virtue of their association with a product, portfolio, project, action, message topic, workflow, or request type), message inboxes, inbox configuration information, actionable notification messages, templates for rendering actionable notification messages, software products, virtualized application packages, resource stack templates, the assignment of selected software products to particular end users and/or user groups, constraints and/or configuration parameter settings for the selected software products, users, and catalogs or portfolios, usage data, billing information, various types of metadata that is maintained for particular software products, unique resource identifiers for products and portfolios (e.g., portfolio keys) and/or information about who a portfolio has been shared with and/or imported by, and/or any other information usable in managing and deploying desktop applications and services, any of which may be stored in any of a variety of data structures or database tables within memory 1620 on one or more computing nodes of a service provider system and/or client computing device used in managing requests for approval and/or actionable notification messages as described herein.

In one embodiment, I/O interface 1630 may be configured to coordinate I/O traffic between processor 1610, system memory 1620, and any peripheral devices in the device, including any of network interface(s) 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface(s) 1640 may be configured to allow data to be exchanged between computer system 1600 and other devices 1660 attached to a network or networks 1650, such as other computer systems or devices as illustrated in the figures, for example. In various embodiments, network interface(s) 1640 may support communication via any suitable wired or wireless general data networks, such as types of Ethernet network, for example. Additionally, network interface(s) 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may be one embodiment of a computer-accessible medium configured to store program instructions and data as described above for implementing various embodiments of the techniques for managing requests for approval and/or actionable notification messages described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1600 via I/O interface 1630. A non-transitory computer-accessible (e.g., computer-readable) storage medium may also include any volatile or non-volatile media such as RAM (e.g. SDRAM, DDR SDRAM, RDRAM, SRAM, etc.), ROM, etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface(s) 1640.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
 a plurality of computing nodes of a service provider that collectively provide services to a plurality of clients of the service provider via a service provider network that is distinct from client networks of the plurality of clients, each of the computing nodes comprising at least one processor and a memory, and the services comprising a plurality of backend services provided for the plurality of clients;
 wherein one or more of the plurality of computing nodes implement an approval service that receives and manages approval requests pertaining to provisioning, administering, or managing computing resources on behalf of the backend services, wherein at least some approval requests trigger messages between the approval service and one or more members over a network external to the service provider network on behalf of the backend services;

a backend interface of the approval service within the service provider network for the backend services for exchanging approval requests and approval results over the service provider network between the approval service and the backend services; and an administrator interface through which a client's administrator interacts with the approval service to manage approval requests transmitted via the backend interface to the approval service over the service provider network from one or more of the backend services provided for the client by the service provider, wherein the approval service is a different service than the one or more backend services that are sources of the approval requests;

wherein the approval service is configured to:
receive, through the administrator interface, a request to create an approval template, wherein the approval template defines one or more criteria for approval or denial of approval requests that are associated with the approval template;

create the approval template, wherein creating the approval template comprises storing a representation of the approval template on service provider resources for subsequent association with approval requests;

receive, through the administrator interface, a request to create an approval group, wherein members of the approval group are members of the client who are authorized to respond to approval requests that are associated with the approval group;

create the approval group, wherein creating the approval group comprises storing a representation of the approval group on service provider resources for subsequent association with approval requests;

receive, through the administrator interface, a request to associate the approval template and the approval group with one or more approval requests;

store information indicating an association between the approval template, the approval group, and the one or more approval requests; and receive, over the service provider network from one of the one or more backend services, a given one of the one or more approval requests;

notify one or more of the members of the approval group, over the network external to the service provider, that the given approval request has been received; and receive, over the external network from the one or more of the members of the approval group, a respective response to the given approval request;

determine, based at least in part on the received responses and the one or more criteria, a result of the given approval request; and transmit, via the backend interface over the service provider network to the one of the one or more backend services, an indication of the result of the given approval request; and wherein the one or more backend services are configured to:
trigger, based on receipt of the result of the given approval request, performance of an action associated with provisioning, administering, or managing one or more of the computing resources.

2. The system of claim 1,
wherein the one or more approval requests are related to a particular product, portfolio, project, action, message topic, workflow, or request type; and
wherein at least one of the approval template or the approval group is associated with one or more other approval requests that are related to a different product, portfolio, project, action, message topic, workflow, or request type.

3. The system of claim 1, wherein the members of the approval group comprise one or more of:
an end user of the client,
a group of end users of the client,
a member of the client's network having a particular identity and access management role,
an identity and access management group, or
another approval group.

4. The system of claim 1, wherein the approval template defines a sequence of two or more approval levels, and wherein each approval level defined by the approval template is associated with a respective approval group.

5. The system of claim 1,
wherein the one or more criteria comprise a voting strategy, and
wherein to define the voting strategy, the approval template specifies one or more of:
a number of affirmative responses required to approve an approval request,
a percentage of the received responses that are required to be in the affirmative to approve an approval request,
a number of negative responses required to deny an approval request,
a percentage of the received responses that are required to be in the negative to deny an approval request,
a number of members of an approval group whose responses are required to be received in order to determine a result of an approval request, or
a percentage of members of an approval group whose responses are required to be received in order to determine a result of an approval request.

6. A method, comprising:
performing, by one or more service provider computers of a service provider network that implement an approval service that receives and manages approval requests pertaining to provisioning, administering, or managing computing resources on behalf of one or more backend services of the service provider for a plurality of clients of the service provider, at least some approval requests triggering messages between the approval service and one or more members over a network external to the service provider network on behalf of the backend services, the service provider network distinct from client networks of the plurality of clients:
providing a backend interface of the approval service within the service provider network for the backend services for exchanging approval requests and results over the service provider network between the approval service and a different service;
receiving, by the approval service, via the backend interface over the service provider network from the different service on behalf of a client of the plurality of clients of the service provider, an approval request, wherein the approval request specifies a service provider product or service for which an authorization to access or utilize the service provider product or service is sought or an action for which authorization to perform the action is sought;

receiving, over the external network, a respective response to the approval request from one or more members of an approval group, wherein the approval group is associated, by the approval service of the service provider, with the approval request received on behalf of the client;

determining, dependent on the received responses and a pre-determined criteria for approval or denial of the approval request, a result of the approval request; and transmitting, over the service provider network to the different service, an indication of the result of the approval request, wherein the result of the approval request triggers performance of an action associated with provisioning, administering, or managing computing resources.

7. The method of claim 6,
wherein the pre-determined criteria comprise a pre-determined voting strategy;
wherein the method further comprises, prior to said receiving the approval request:
   creating an approval template on behalf of the client of the service provider; and
   associating the approval template with the approval request; and
wherein the approval template defines the pre-determined voting strategy.

8. The method of claim 7, wherein at least one of the approval group or the approval template is associated with one or more other approval requests by the approval service.

9. The method of claim 7, wherein the approval template defines a sequence of two or more approval levels, and wherein each approval level defined by the approval template is associated with a respective approval group.

10. The method of claim 7,
wherein the approval group is associated with a first approval level defined by the approval template;
wherein another approval group is associated with a second approval level defined by the approval template; and
wherein the method further comprises, in response to receiving the approval request:
   notifying the members of the approval group that the approval request has been received; and
   notifying members of the other approval group that the approval request has been received.

11. The method of claim 7,
wherein the approval group is associated with a first approval level defined by the approval template;
wherein another approval group is associated with a second approval level defined by the approval template; and
wherein the method further comprises:
   notifying the members of the approval group that the approval request has been received; and
   notifying members of the other approval group that the approval request has been received in response to a pre-determined amount of time passing without receiving enough responses to the approval request from members of the approval group to enable the result of the approval request to be determined; and
wherein said determining the result of the approval request comprises:
   receiving a respective response to the approval request from each of one or more members of the other approval group; and
   determining, dependent on the responses received from the one or more members of the other approval group and a pre-determined voting strategy defined for the second approval level, the result of the approval request.

12. The method of claim 7,
wherein said determining the result of the approval request comprises assigning a default result for the approval request in response to a pre-determined amount of time passing without receiving enough responses to the approval request from members of the approval group to enable the result of the approval request to be determined.

13. The method of claim 6,
wherein the client of the service provider consumes services provided by the service provider, including the approval service and the different service; and
wherein the method further comprises, prior to receiving the approval request:
   receiving, from an administrator of the client, a request to create the approval group on behalf of the client, wherein the request to create the approval group comprises information indicating that the one or more members of the client are authorized to respond to approval requests that are associated with the approval group.

14. The method of claim 7,
wherein the client of the service provider consumes services provided by the service provider, including the approval service and the different service;
wherein the method further comprises, prior to receiving the approval request:
   receiving, from an administrator of the client, a request to create the approval template on behalf of the client;
   creating the approval template;
   receiving, from an administrator of the client, a request to associate the approval template with a specified product, portfolio, project, action, message topic, workflow, or request type; and
   associating the approval template with the specified product, portfolio, project, action, message topic, workflow, or request type; and
wherein the approval request comprises a request for authorization to access or utilize a product or service that is related to the specified product, portfolio, project, action, message topic, workflow, or request type or to perform an action related to the specified product, portfolio, project, action, message topic, workflow, or request type.

15. The method of claim 6,
wherein the method further comprises notifying the members of the approval group that the approval request has been received in response to receiving the approval request; and
wherein said receiving the respective response to the approval request from each of one or more members of the approval group comprises receiving the respective responses to the approval requests from each of one or more members of an approval group in response to said notifying.

16. The method of claim 15,
wherein said receiving the approval request comprises receiving the approval request in an actionable notification message that is managed by a notification service implemented on behalf of the service provider;

the method further comprising:

associating the approval group with a message inbox created by the notification service on behalf of the client of the service provider; and wherein said notifying comprises posting the actionable notification message to the message inbox for subsequent retrieval by members of the approval group.

17. A non-transitory computer-readable storage medium storing program instructions that when executed on one or more computers cause the one or more computers to implement an approval service, wherein the approval service is configured to:

present a backend interface of the approval service within a service provider network through which one or more other services submit respective approval requests that pertain to provisioning, administration, or management of computing resources, the approval requests to be managed by the approval service on behalf of each of two or more clients of a service provider that provides at least the one or more other services for the two or more clients, wherein the two or more clients are consumers of the one or more other services, wherein at least some approval requests trigger messages between the approval service and one or more members over a network external to the service provider network on behalf of the services;

receive, over the service provider network from one of the one or more other services, via the backend interface, a given approval request, wherein the given approval request is related to a particular product, portfolio, project, action, message topic, workflow, or request type;

provide a mechanism through which one or more members of an approval group that is associated with the given approval request submits, over an external network, a respective response to the given approval request;

determine a result of the given approval request dependent, at least in part, on the respective responses to the given approval request;

receive, over the service provider network via the backend interface, another approval request, wherein the other approval request is related to a different product, portfolio, project, action, message topic, workflow, or request type, and wherein the approval group is associated with the other approval request;

provide a mechanism through which one or more members of the approval group submits, over the external network, a respective response to the other approval request;

determine a result of the other approval request dependent, at least in part, on the respective responses to the other approval request; and transmit, over the service provider network via the backend interface, to the one of the one or more other services, an indication of the result of the other approval request, wherein the result of the approval request triggers performance of an action associated with provisioning, administering, or managing computing resources.

18. The non-transitory computer-readable storage medium of claim 17, wherein the given approval request is associated with a given approval template that defines a voting strategy for approval or denial of approval requests that are associated with the given approval template; and wherein the other approval request is associated with another approval template that defines a different voting strategy for approval or denial of approval requests that are associated with the other approval template.

19. The non-transitory computer-readable storage medium of claim 17, wherein at least one of the given approval request or the other approval request is associated with an approval template that defines a sequence of two or more approval levels;

wherein the approval group is associated with a first approval level defined by the approval template; and wherein the approval template defines:

a voting strategy for approval or denial of approval requests that are associated with the approval template at a first approval level and a different voting strategy for approval or denial of approval requests that are associated with the approval template at a second approval level defined by the approval template; or a second approval group that is associated with the second approval level defined by the approval template.

20. The non-transitory computer-readable storage medium of claim 17, wherein, in response to the determination of the result of the given approval request or the determination of the result of the other approval request, the approval service is configured to initiate the performance of a particular action or workflow by the one of the one or more other services.

* * * * *